United States Patent
Yamaguchi et al.

(10) Patent No.: US 6,234,144 B1
(45) Date of Patent: May 22, 2001

(54) INTAKE-AIR QUANTITY CONTROL APPARATUS FOR INTERNAL COMBUSTION ENGINE WITH VARIABLE VALVE TIMING SYSTEM

(75) Inventors: Musashi Yamaguchi; Takeaki Obata, both of Kanagawa; Nobutaka Takahashi, Yokohama, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/478,214

(22) Filed: Jan. 5, 2000

(30) Foreign Application Priority Data

Jan. 14, 1999 (JP) .................................................. 11-007620

(51) Int. Cl.$^7$ ................................. F02D 9/08; F01L 1/34
(52) U.S. Cl. ..................... 123/399; 123/90.11; 123/90.15
(58) Field of Search ................................... 123/399, 404, 123/90.11, 90.15–90.18

(56) References Cited

U.S. PATENT DOCUMENTS

| 4,995,351 | 2/1991 | Ohkubo et al. ................... 123/90.11 |
| 5,143,037 | * 9/1992 | Sawamoto ............................. 123/399 |
| 5,590,632 | 1/1997 | Kato et al. ............................ 123/480 |
| 5,635,634 | 6/1997 | Reuschenbach et al. ........... 73/118.2 |
| 5,713,317 | 2/1998 | Yoshioka ............................ 123/90.15 |
| 5,845,613 | 12/1998 | Yoshikawa ......................... 123/90.15 |
| 5,967,125 | * 10/1999 | Morikawa .......................... 123/90.15 |
| 6,039,026 | * 3/2000 | Shiraishi ............................. 123/399 |
| 6,148,791 | * 11/2000 | Fujieda et al. ..................... 123/90.11 |

FOREIGN PATENT DOCUMENTS 9-256823  9/1997 (JP) .

\* cited by examiner

*Primary Examiner*—Erick Solis
(74) *Attorney, Agent, or Firm*—Foley & Lardner

(57) ABSTRACT

An intake-air quantity control apparatus for an internal combustion engine with a variable valve timing system associated with at least an intake valve, comprises a control unit controlling an intake-air quantity of air entering the internal combustion engine based on at least one of an intake valve open timing and an intake valve closure timing of the intake valve. The control unit determines a desired internal pressure in an intake-air passage based on a predetermined operating parameter, and detecting an operation delay-time fluctuation rate for at least the intake valve. A desired intake-air quantity is arithmetically calculated on the basis of engine operating conditions. The control unit includes a compensation section which compensates for the desired internal pressure based on at least one of the operation delay-time fluctuation rate and the desired intake-air quantity to produce a compensated internal pressure. A throttle opening is controlled depending on both the compensated internal pressure and the desired intake-air quantity. Also, the intake valve open timing and the intake valve closure timing are controlled depending on both the compensated internal pressure and the desired intake-air quantity.

16 Claims, 16 Drawing Sheets

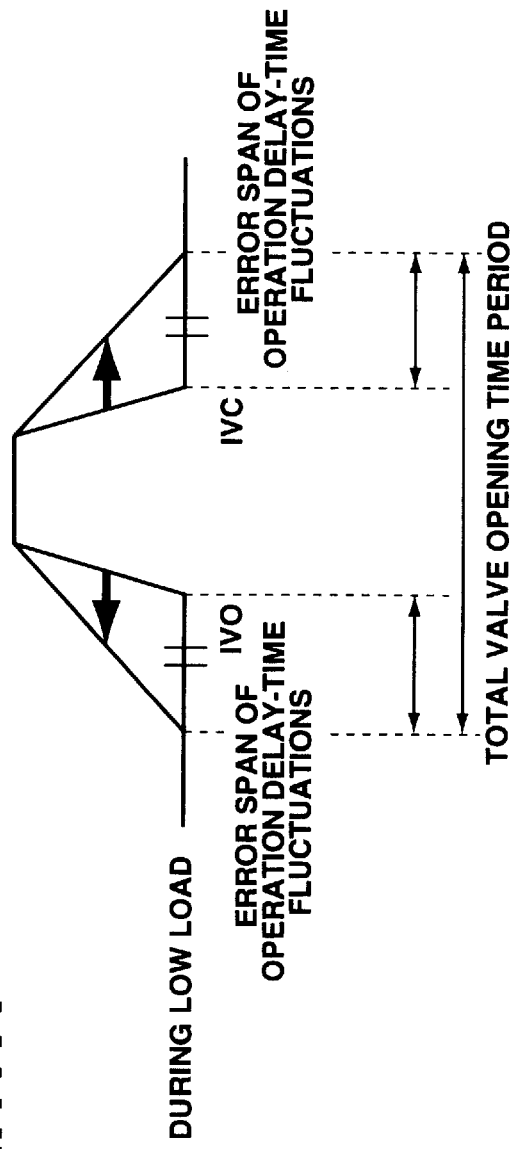
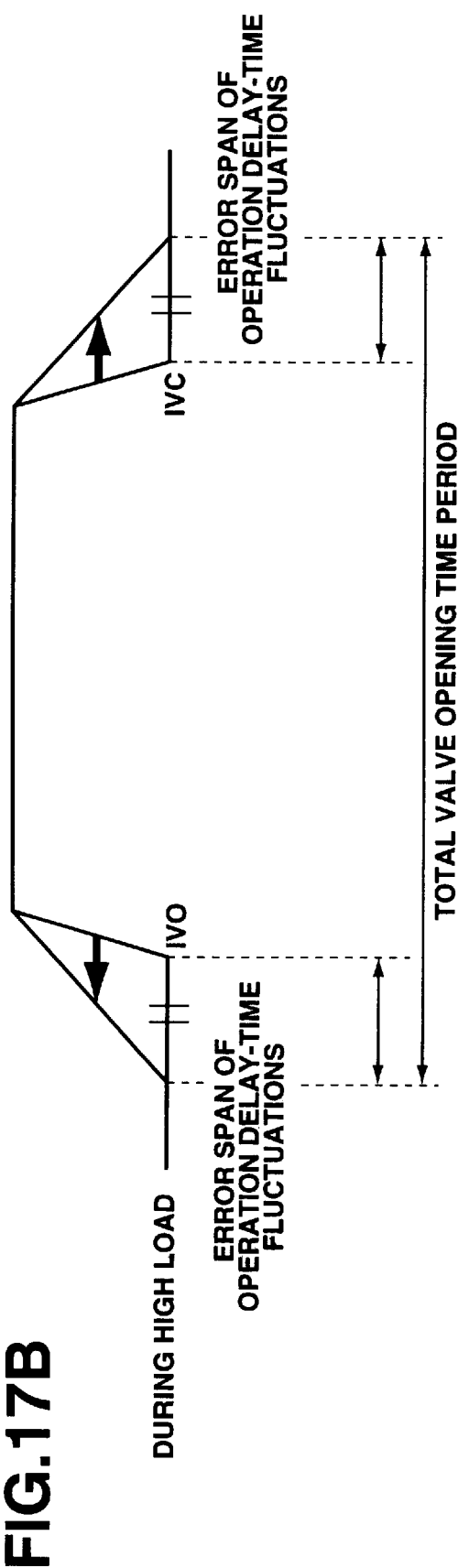
FIG.17A
FIG.17B

INTAKE-AIR QUANTITY CONTROL APPARATUS FOR INTERNAL COMBUSTION ENGINE WITH VARIABLE VALVE TIMING SYSTEM

BACKGROUND OF THE INVENTION

1. Field of the Invention

The present invention relates to the improvements of an intake-air quantity control apparatus for an internal combustion engine equipped with a variable valve timing system capable of electronically arbitrarily controlling an intake- and/or exhaust-valve timing, depending upon engine/vehicle operating conditions, and specifically to techniques for controlling a quantity of intake air entering an internal combustion engine toward a desired intake-air quantity by electronically controlling an intake valve open timing (often abbreviated to "IVO") and an intake valve closure timing (often abbreviated to "IVC").

2. Description of the Prior Art

Recently, there have been proposed and developed various electronically-controlled variable valve timing systems which are capable of operating intake and exhaust valves electromagnetically. One such electronically-controlled variable valve timing system for an internal combustion engine having electromagnetically-operated valve units has been disclosed in Japanese Patent Provisional Publication No. 9-256823. In the Japanese Patent Provisional Publication No. 9-256823, each of intake and exhaust valves is comprised of an electromagnetic solenoid valve whose opening and closing are achieved by way of an electromagnetic force instead of the use of a typical cam-drive mechanism. Thus, an intake-valve closure timing (IVC), an intake-valve open timing (IVO), an exhaust-valve open timing (EVO), and an exhaust-valve closure timing (EVC) can be continually changed in response to command signals from an electronic control unit (ECU). In such internal combustion engines with a variable valve timing control system having electromagnetically-operated valve units, an intake-air quantity can be adjusted by properly controlling or managing an intake valve timing (an intake-valve open timing and/or an intake-valve closure timing), in place of throttle-opening adjustment. In this type of engines with electromagnetically-operated engine valve units, a throttle valve is often eliminated, or a throttle valve is installed on the engine only for the purpose of generation of a negative pressure in an intake-air passage. Suppose an internal pressure in the intake-air passage reaches a pressure level close to atmospheric pressure with the throttle kept at an extremely less throttle opening. In this case, the intake-air quantity control system based on adjustment of an intake-valve opening time period (a time interval between IVO and IVC) is superior to that based on only the throttle-opening adjustment, from the viewpoint of a pumping loss.

SUMMARY OF THE INVENTION

In the previously-discussed variable valve timing system having electromagnetically-operated engine valve units, there is a delay for opening and/or closing operations of each of the electromagnetically-operated engine valves with respect to a timing of output of a command signal from the ECU to the respective engine valve, owing to various factors, namely aged deterioration of valve-spring characteristics, increased sliding resistance caused by a dirty aperture between the sliding portion of each of the engine valves and the associated guiding inner wall portion, clogged or choked up with deposits of sooty carbon or engine oil, and fluctuations in a demagnetized timing of each engine valve. The delay time in the valve opening and/or closing operations tends to fluctuate or vary for each engine cylinder, or the delay time in the valve opening and/or closing operations tends to fluctuate or vary for each intake stroke of the same engine cylinder. In the presence of undesired fluctuations in a delay time in the valve opening/closing operations, a quantity of intake air entering a certain engine cylinder also tends to fluctuate or vary at any time. The fluctuations in the delay time in the valve opening and/or closing operations will be hereinafter referred to simply as "valve operation delay-time fluctuations". Additionally, owing to the "valve operation delay-time fluctuations", the intake-air quantity may vary for each engine cylinder. As can be appreciated from two diagrams of FIGS. 17A and 17B, showing the relationship between an error span based on the valve operation delay-time fluctuations and a total valve opening time period, the opening time period of the intake valve is generally set at a relatively small period during low engine load (see FIG. 17A), in comparison with during high engine load (see FIG. 17B). Note that the ratio of the error span of the valve operation delay-time fluctuations to the total valve opening time period obtained during the low engine load tends to become greater than that obtained during the high engine load. In other words, there is an increased tendency for the intake-air quantity to be remarkably affected by the valve operation delay-time fluctuations especially during low engine loads. The increased fluctuations in the intake-air quantity, which may occur due to the valve operation delay-time fluctuations occurring during low engine loads, deteriorate idling stability of the engine and driveability of the vehicle.

Accordingly, it is an object of the invention to provide an intake-air quantity control apparatus for an internal combustion engine with a variable valve timing system which avoids the aforementioned disadvantages of the prior art.

It is another object of the invention to provide an intake-air quantity control apparatus for an internal combustion engine with a variable valve timing system which is capable of stably controlling a quantity of intake air entering each engine cylinder toward a desired intake-air quantity, even when there are valve operation delay-time fluctuations in at least an intake valve.

In order to accomplish the aforementioned and other objects of the present invention, an intake-air quantity control apparatus for an internal combustion engine with a variable valve timing system associated with at least an intake valve, comprises a control unit which controls an intake-air quantity of air entering the internal combustion engine on the basis of at least one of an intake valve open timing and an intake valve closure timing of the intake valve, the control unit comprising a desired internal pressure determination section which determines a desired internal pressure in an intake-air passage on the basis of a predetermined operating parameter, an operation delay-time fluctuation rate detection section which detects an operation delay-time fluctuation rate for fluctuations in an operation delay time of at least the intake valve, a desired intake-air quantity arithmetic-calculation section which arithmetically calculates a desired intake-air quantity on the basis of engine operating conditions, a compensation section which compensates for the desired internal pressure on the basis of at least one of the operation delay-time fluctuation rate and the desired intake-air quantity to produce a compensated internal pressure, a throttle-opening control section which controls a throttle opening on the basis of both the compensated internal pressure and the desired intake-air quantity, and an intake-valve timing control section which controls the intake valve open timing and the intake valve closure timing on the basis of both the compensated internal pressure and the desired intake-air quantity.

According to another aspect of the invention, an intake-air quantity control apparatus for an internal combustion engine with a variable valve timing system associated with at least an intake valve located at each of engine cylinders, comprises a control unit which controls an intake-air quantity of air entering the internal combustion engine on the basis of at least one of an intake valve open timing and an intake valve closure timing of the intake valve, the control unit comprising a desired internal pressure determination section which determines a desired internal pressure in an intake-air passage on the basis of at least an engine temperature, an operation delay-time fluctuation rate detection section which detects an operation delay-time fluctuation rate for fluctuations in an operation delay time of at least the intake valve, a desired intake-air quantity arithmetic-calculation section which arithmetically calculates a desired intake-air quantity on the basis of operating parameters corresponding to engine speed and engine load, a compensation section which compensates for the desired internal pressure on the basis of at least the operation delay-time fluctuation rate to produce a compensated internal pressure, a throttle-opening control section which controls a throttle opening on the basis of both the compensated internal pressure and the desired intake-air quantity, and an intake-valve timing control section which controls the intake valve open timing and the intake valve closure timing on the basis of both the compensated internal pressure and the desired intake-air quantity.

According to a further aspect of the invention, an intake-air quantity control apparatus for an internal combustion engine with a variable valve timing system associated with at least an intake valve, comprises a control unit which controls an intake-air quantity of air entering the internal combustion engine on the basis of at least one of an intake valve open timing and an intake valve closure timing of the intake valve, the control unit comprising a desired internal pressure determination section which determines a desired internal pressure in an intake-air passage on the basis of at least an engine temperature, a desired intake-air quantity arithmetic-calculation section which arithmetically calculates a desired intake-air quantity on the basis of operating parameters corresponding to engine speed and engine load, a compensation section which compensates for the desired internal pressure on the basis of at least the desired intake-air quantity to produce a compensated internal pressure, a throttle-opening control section which controls a throttle opening on the basis of both the compensated internal pressure and the desired intake-air quantity, and an intake-valve timing control section which controls the intake valve open timing and the intake valve closure timing on the basis of both the compensated internal pressure and the desired intake-air quantity.

According to a still further aspect of the invention, in an electronically-controlled internal combustion engine with a variable valve timing system associated with at least an intake valve, an electronically-controlled throttle, and an intake-valve side actuator capable of adjusting an opening of the intake valve, an intake-air quantity control system configured to be electronically connected to the electronically-controlled throttle for controlling a throttle opening and connected to the intake-valve side actuator for controlling an intake-air quantity of air entering the internal combustion engine on the basis of at least one of an intake valve open timing and an intake valve closure timing of the intake valve, the intake-air quantity control system comprising a desired internal pressure determination means for determining a desired internal pressure in an intake-air passage on the basis of at least an engine coolant temperature, an operation delay-time fluctuation rate detection means for detecting an operation delay-time fluctuation rate for fluctuations in an operation delay time of at least the intake valve, a desired intake-air quantity arithmetic-calculation means for arithmetically calculating a desired intake-air quantity on the basis of engine operating conditions, a compensation means for compensating for the desired internal pressure on the basis of at least one of the operation delay-time fluctuation rate and the desired intake-air quantity to produce a compensated internal pressure, a throttle-opening control means connected to the electronically-controlled throttle for controlling a throttle opening on the basis of both the compensated internal pressure and the desired intake-air quantity, and an intake-valve timing control means connected to the intake-valve side actuator for controlling the intake valve open timing and the intake valve closure timing on the basis of both the compensated internal pressure and the desired intake-air quantity.

According to another aspect of the invention, a method for controlling an intake-air quantity of air entering each of engine cylinders for a computer-controlled internal combustion engine with a variable valve timing system associated with at least an intake valve located at each of the engine cylinders, an electronically-controlled throttle, and an intake-valve side actuator capable of adjusting an opening of the intake valve, an intake-air quantity control system configured to be electronically connected to the electronically-controlled throttle for controlling a throttle opening and connected to the intake-valve side actuator for controlling an intake-air quantity of air entering the internal combustion engine on the basis of at least one of an intake valve open timing and an intake valve closure timing of the intake valve, the method comprises determining a desired internal pressure in an intake-air passage on the basis of at least an engine temperature, detecting an operation delay-time fluctuation rate for fluctuations in an operation delay time of at least the intake valve, arithmetically calculating a desired intake-air quantity on the basis of operating parameters corresponding to engine load and engine load, compensating for the desired internal pressure on the basis of at least the operation delay-time fluctuation rate to produce a compensated internal pressure, controlling a throttle opening of the electronically-controlled throttle on the basis of both the compensated internal pressure and the desired intake-air quantity, and controlling the intake valve open timing and the intake valve closure timing on the basis of both the compensated internal pressure and the desired intake-air quantity.

According to another aspect of the invention, a method for controlling an intake-air quantity of air entering each of engine cylinders for a computer-controlled internal combustion engine with a variable valve timing system associated with at least an intake valve, an electronically-controlled throttle, and an intake-valve side actuator capable of adjusting an opening of the intake valve, an intake-air quantity control system configured to be electronically connected to the electronically-controlled throttle for controlling a throttle opening and connected to the intake-valve side actuator for controlling an intake-air quantity of air entering the internal combustion engine on the basis of at least one of an intake valve open timing and an intake valve closure timing of the intake valve, the method comprising determining a desired internal pressure in an intake-air passage on the basis of at least an engine temperature, arithmetically calculating a desired intake-air quantity on the basis of operating parameters corresponding to engine speed and engine load, compensating for the desired internal pressure on the basis of at least the desired intake-air quantity to produce a compensated internal pressure, controlling a throttle opening of the electronically-controlled throttle on the basis of both the compensated internal pressure and the desired intake-air quantity, and controlling the intake valve open timing and the intake valve closure timing on the basis of both the compensated internal pressure and the desired intake-air quantity.

According to another aspect of the invention, a method for controlling an intake-air quantity of air entering each of engine cylinders for a computer-controlled internal combustion engine with a variable valve timing system associated with at least an intake valve, an electronically-controlled throttle, and an intake-valve side actuator capable of adjusting an opening of the intake valve, an intake-air quantity control system configured to be electronically connected to the electronically-controlled throttle for controlling a throttle opening and connected to the intake-valve side actuator for controlling an intake-air quantity of air entering the internal combustion engine on the basis of at least one of an intake valve open timing and an intake valve closure timing of the intake valve, the method comprising determining a desired internal pressure in an intake-air passage on the basis of at least an engine coolant temperature, detecting an operation delay-time fluctuation rate for fluctuations in an operation delay time of at least the intake valve, arithmetically calculating a desired intake-air quantity on the basis of engine operating conditions, compensating for the desired internal pressure on the basis of at least one of the operation delay-time fluctuation rate and the desired intake-air quantity to produce a compensated internal pressure, controlling a throttle opening of the electronically-controlled throttle on the basis of both the compensated internal pressure and the desired intake-air quantity, and controlling the intake valve open timing and the intake valve closure timing on the basis of both the compensated internal pressure and the desired intake-air quantity.

BRIEF DESCRIPTION OF THE DRAWINGS

FIGS. 17A and 17B are timing charts explaining the ratio of an error span based on intake-valve operation delay-time fluctuations to a total intake-valve opening time period, respectively at low and high engine loads.

DESCRIPTION OF THE PREFERRED EMBODIMENTS

Figure 1:
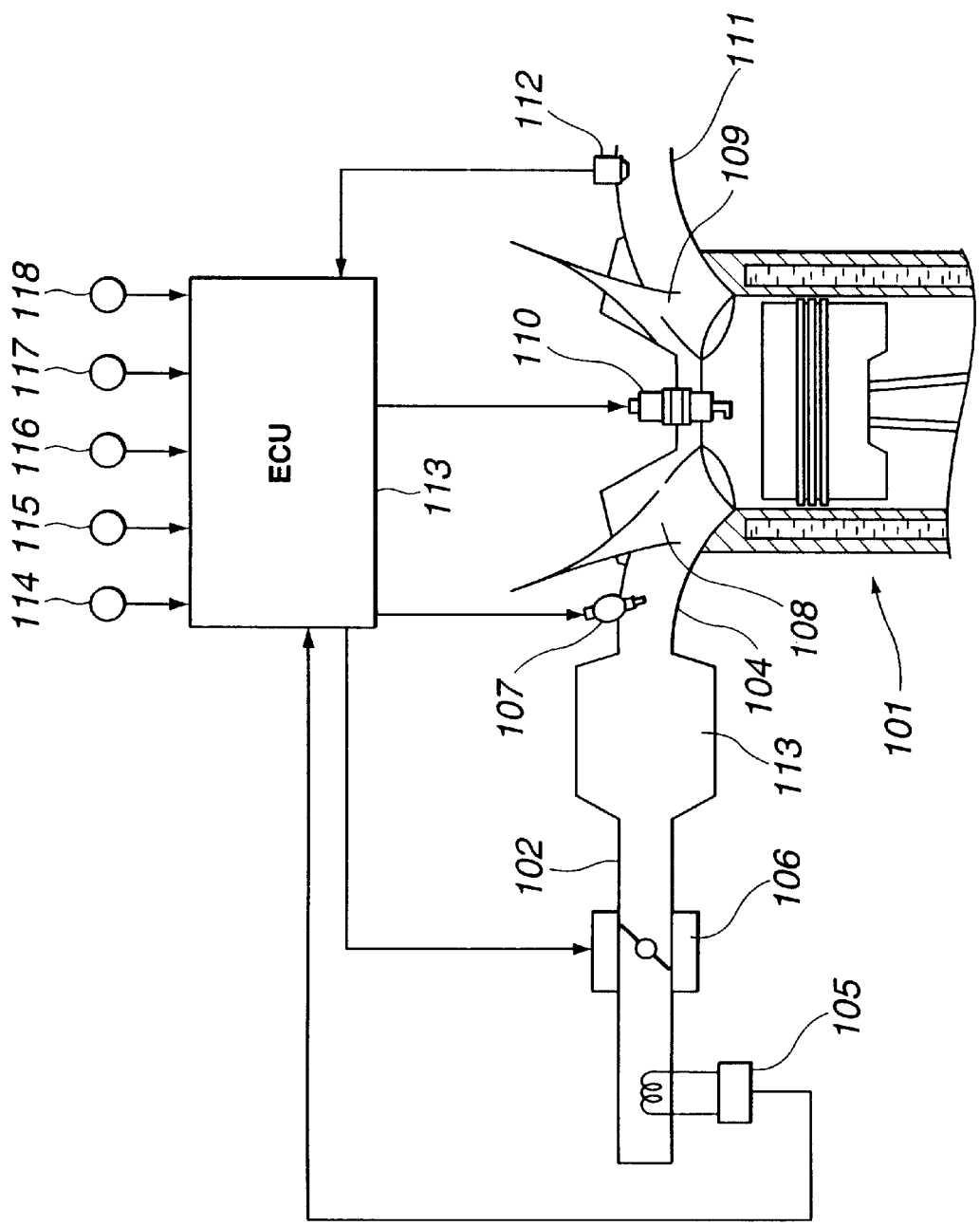
FIG. 1 is a system diagram illustrating one embodiment of an intake-air quantity control apparatus for an internal combustion engine with a variable valve timing system.
Figure 2:
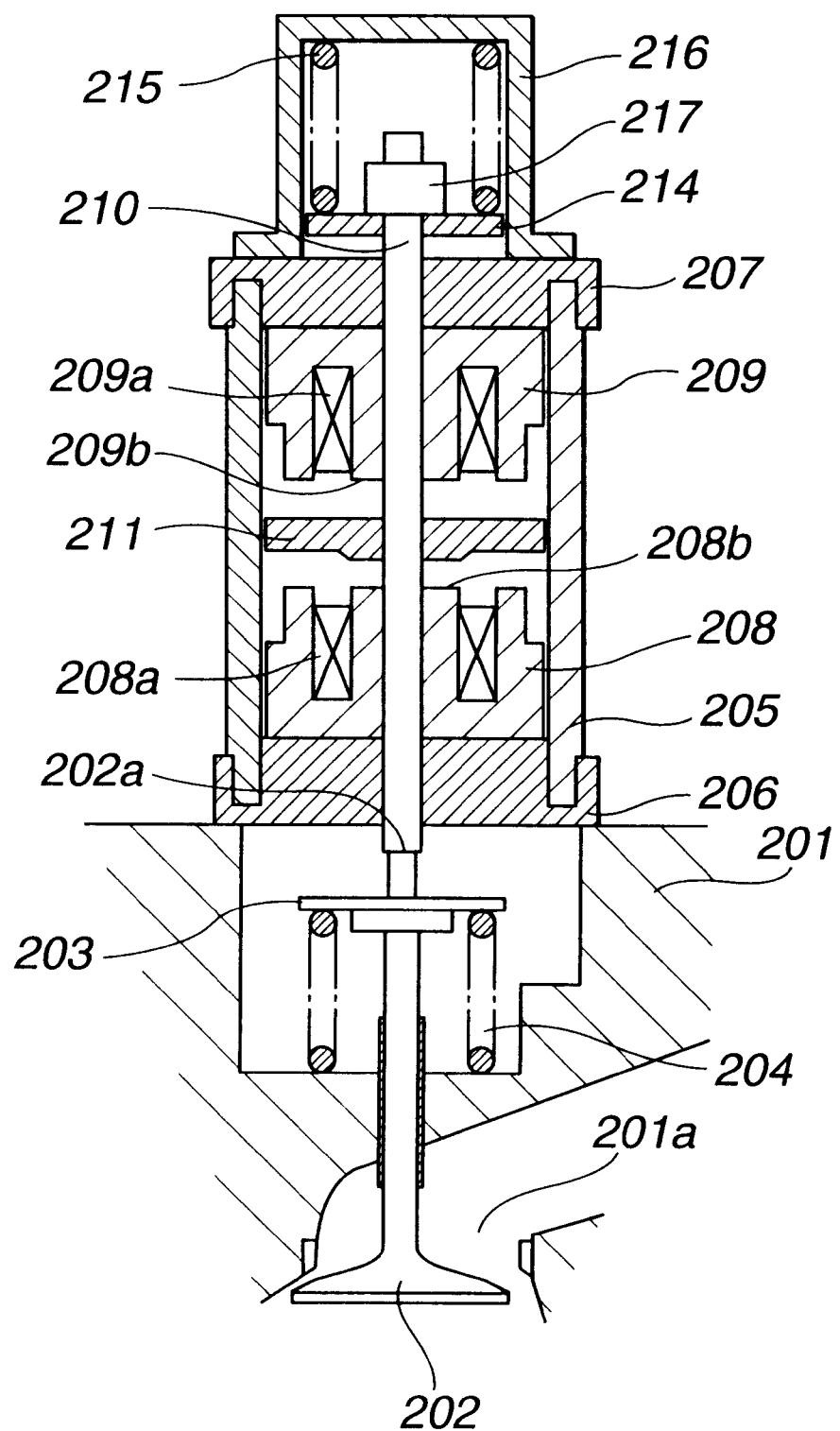
FIG. 2 is a longitudinal cross sectional view illustrating an electromagnetically-operated engine valve unit employed in the intake-air quantity control apparatus of the embodiment.

Referring now to the drawings, particularly to FIG. 1, the intake-air quantity control apparatus of the invention is exemplified in electromagnetically-powered valve operating units mounted on each engine cylinder of an in-line four-cylinder internal combustion engine 101. Fresh air (intake air) is introduced into each engine cylinder through an intake-air duct (or an intake-air pipe or an intake-air passage) 102, an intake-air collector 103, and an intake manifold 104. An air-flow meter 105 is located on the intake-air duct 102 for detecting a quantity of air flowing through the air-flow meter and drawn into the engine 101. A hot-wire mass air flow meter is commonly used as the air quantity sensor. An electronically-controlled throttle valve 106 is provided between the air-flow meter 105 and the collector 103. Fuel injectors 107 are provided at each of branched portions of the intake manifold 104. A cylinder head of the engine 101 is formed with an intake-valve port communicating with the intake manifold 104 and an exhaust-valve port communicating with an exhaust manifold 111. In the intake-air quantity control apparatus of the embodiment, an electromagnetically-powered intake valve unit 108 is located in the cylinder head for opening and closing the intake port, whereas an electromagnetically-powered exhaust valve unit 109 is located in the cylinder head for opening and closing the exhaust port. Each of the intake valve unit 108 and the exhaust valve unit 109 is actually constructed as an electromagnetically-powered valve operating unit as shown in FIG. 2. A spark plug 110 is screwed into a tapped hole of the cylinder head for each combustion chamber to ignite the air fuel mixture in the combustion chamber. Hot burned gases from the engine cylinders are exhausted through the exhaust valve 109 and the exhaust manifold 111 into an exhaust pipe (not shown). Reference sign 112 denotes an air/fuel ratio sensor 112 which is located in the junction of the exhaust manifold 111 for monitoring or detecting an air/fuel mixture ratio (often abbreviated to "A/F" ratio) based on the percentage of oxygen contained within the engine exhaust gases at all times when the engine is running, so that an electronic control module (ECM) or an electronic engine control unit (ECU) 113 can maintain the A/F ratio at as close to stoichiometric as possible, for complete combustion and minimum exhaust emissions. The electronic control unit (ECU) 113 usually comprises a microcomputer. Although it is not clearly shown in FIG. 1, the ECU 113 includes a central processing unit (CPU) that performs necessary arithmetic calculations, processes informational data, compares signals from engine/vehicle sensors to predetermined or preprogrammed threshold values, and makes necessary decisions of acceptance, and memories (RAM, ROM), an input/output interface, and drivers (driver circuits) for amplification of output signals from the output interface. Actually, the ECU 113 performs various data processing actions shown in FIGS. 3 through 13 which will be fully described later. The input interface of the ECU 113 receives input informational data from various engine/vehicle sensors, namely the airflow meter 105, the A/F ratio sensor 112, a crank-angle sensor 114, an engine temperature sensor 115, an intake-air temperature sensor 116, an accelerator opening sensor 117, and a vehicle speed sensor 118. The output interface of the ECU 113 is configured to be electronically connected often through the driver circuits to electrical loads, such as the electronically-controlled throttle valve 106, fuel injector solenoids of the fuel injectors 107, the spark plugs 110, an intake-valve side electromagnetic actuator constructing part of the intake valve unit 108, and an exhaust-valve side electromagnetic actuator constructing part of the exhaust valve unit 109, for generating control command signals to operate these electrical loads. The crank angle sensor 114 is provided for monitoring engine speed Ne as well as a relative position of the engine crankshaft. A coolant temperature sensor is usually used as the engine temperature sensor 115. The coolant temperature sensor is mounted on the engine and usually screwed into one of top coolant passages to sense the actual operating temperature of the engine (the engine coolant temperature Tw). The intake-air temperature sensor 116 is located on the intake-air duct 102 or the intake manifold 104 for monitoring and reacting the air temperature within the intake-air duct (or the intake manifold). The intake-air temperature sensor 106 is useful to detect changes in air density of airflow through the intake-air duct 102. The accelerator opening sensor 117 is located near the accelerator for monitoring an opening APO of the accelerator (the amount of depression of the accelerator pedal). The vehicle speed sensor 118 is usually located at either the transmission or transaxle (on front-wheel drive vehicles) for monitoring the output shaft speed to the road wheels. The output shaft speed is relayed a pulsing voltage signal to the input interface of the ECU 113 and converted into the vehicle speed data. The operating parameters detected by the previously-noted sensors are used to electronically control an ignition timing of an electronic ignition system containing the spark plugs 110, an injection amount as well as a fuel-injection timing of each of the injectors 110 included in an electronic fuel-injection system, a throttle opening of the electronically-controlled throttle valve 106, an intake-valve closure timing (IVC) of each of the intake valve units 108, an intake-valve open timing (IVO) of each of the intake valve units 108, an exhaust-valve open timing (EVO) of each of the exhaust valve units 109, and an exhaust-valve closure timing (EVC) of each of the exhaust valve units 109.

Referring now to FIG. 2, there is shown the detailed construction of each of the electromagnetically-powered intake valve unit 108 and the electromagnetically-powered exhaust valve unit 109. As seen from the cross section shown in FIG. 2, the electromagnetically-powered engine valve unit (108, 109) includes an electromagnetic actuator. The electromagnetic actuator is comprised of at least an axially-movable plunger (consisting of a movable rod 210 fixed to the tip end 202a of the valve stem of the engine valve portion 202, a movable disc-like portion 211 made of magnetic substance, fixed to the middle portion of the rod 210, and located between two opposing attracting faces 208b and 209b of the magnets 208 and 209), an upper coiled valve spring 215, a lower coiled valve spring 204, upper and lower electromagnetic coils 209a and 208a, and upper and lower magnets 209 and 208. The movable plunger rod 210 is slidably fitted into the axial central bores of the magnets 206 and 207 and coaxially arranged with the valve stem of the engine valve portion 202. The valve portion 202 of the engine valve unit (108, 109) is slidably supported on a valve guide (not numbered) in the cylinder head 201. A valve retainer 203 is fixedly connected to the valve stem. The lower valve spring 204 is disposed between the valve retainer 203 and the bottom flattened face of the recessed portion of the cylinder head 201, to permanently bias the movable plunger in a direction closing the port 201a of the cylinder head 201. Reference signs 205, 206, and 207 denote three-split housings in which the two magnets 208 and 209 are accommodated. These housings 205, 206, and 207 are fixedly mounted on the cylinder head 201. The upper electromagnetic coil 209a is disposed in the annular recessed portion formed in the upper magnet 209, while the lower electromagnetic coil 208a is disposed in the annular recessed portion formed in the lower magnet 208. When the electromagnetic coil 208a is excited by means of the driver associated therewith, the movable disc-like plunger portion 211 is attracted downwards (that is, toward the upper attracting face 208b of the lower magnet 208) against the bias of the lower valve spring 204 by way of an attraction force. Conversely, when the electromagnetic coil 209a is excited by means of the driver associated therewith, the movable disc-like plunger portion 211 is attracted upwards (that is, toward the lower attracting face 209b of the upper magnet 209) against the bias of the upper valve spring 215 by way of an attraction force. An upper valve-spring seat 214 is fixed to the upper end of the movable plunger rod 210. The upper valve spring 215 is disposed between the upper valve-spring seat 214 and the upper wall portion of a spring cover 216, to permanently bias the movable plunger in a direction opening the port 201a. With the previously-noted arrangement, it is possible to arbitrarily control the opening and closing of the engine valve unit (108, 109) by controlling the activation and deactivation of each of the electromagnetic coils 208a and 209a. A displacement sensor 217 is located at the tip end of the movable plunger rod 210 for monitoring or detecting an axial displacement (or an actual valve lift or an actual valve lifting height) of the rod 210. Usually, the displacement sensor 217 in its simplest form is generally one of a potentiometer (a variable resistor).

Details of the intake-air quantity control executed by the control apparatus of the embodiment are described hereunder in reference to the flow charts shown in FIGS. 3 through 13. Each of the programs (or the arithmetic-calculation routines) shown in FIGS. 3–13 is executed as time-triggered interrupt routines to be triggered every predetermined time intervals such as 10 milliseconds.

Figure 3:
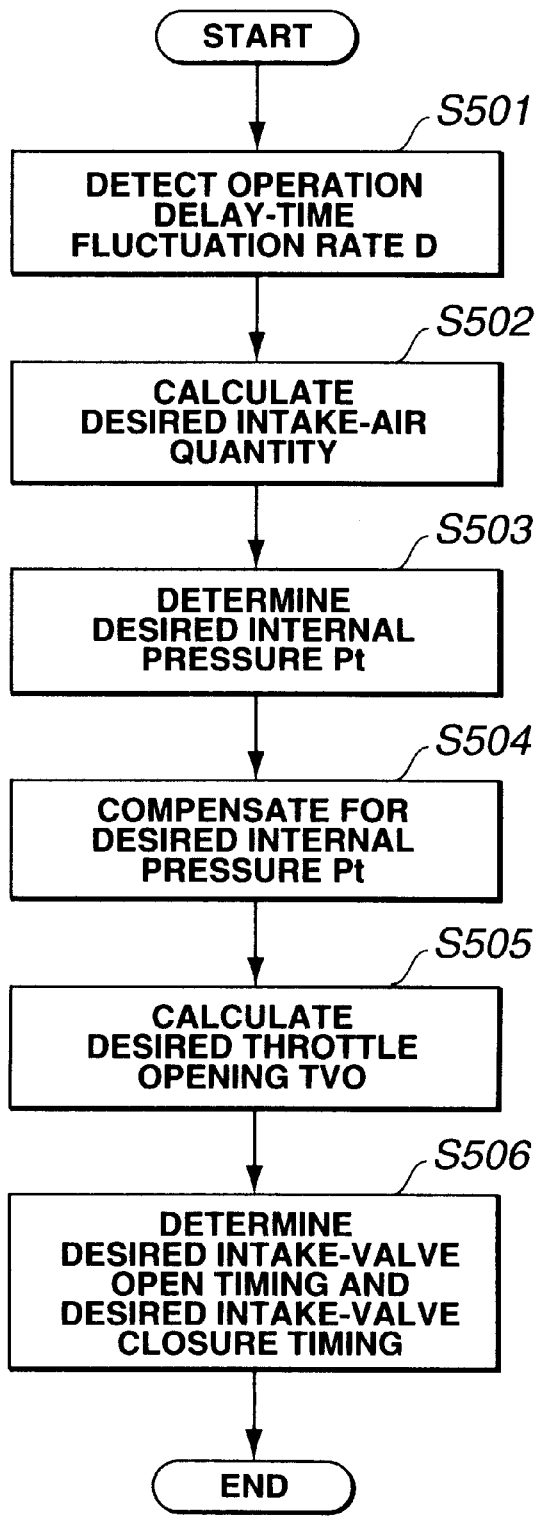
FIG. 3 is a flow chart illustrating a first desired-intake-valve-open-timing plus desired-intake-valve-closure-timing arithmetic-calculation routine.

Referring now to FIG. 3, there is shown the first desired-intake-valve-open-timing plus desired-intake-valve-closure-timing arithmetic-calculation routine for the intake valve unit 108.

Figure 5:
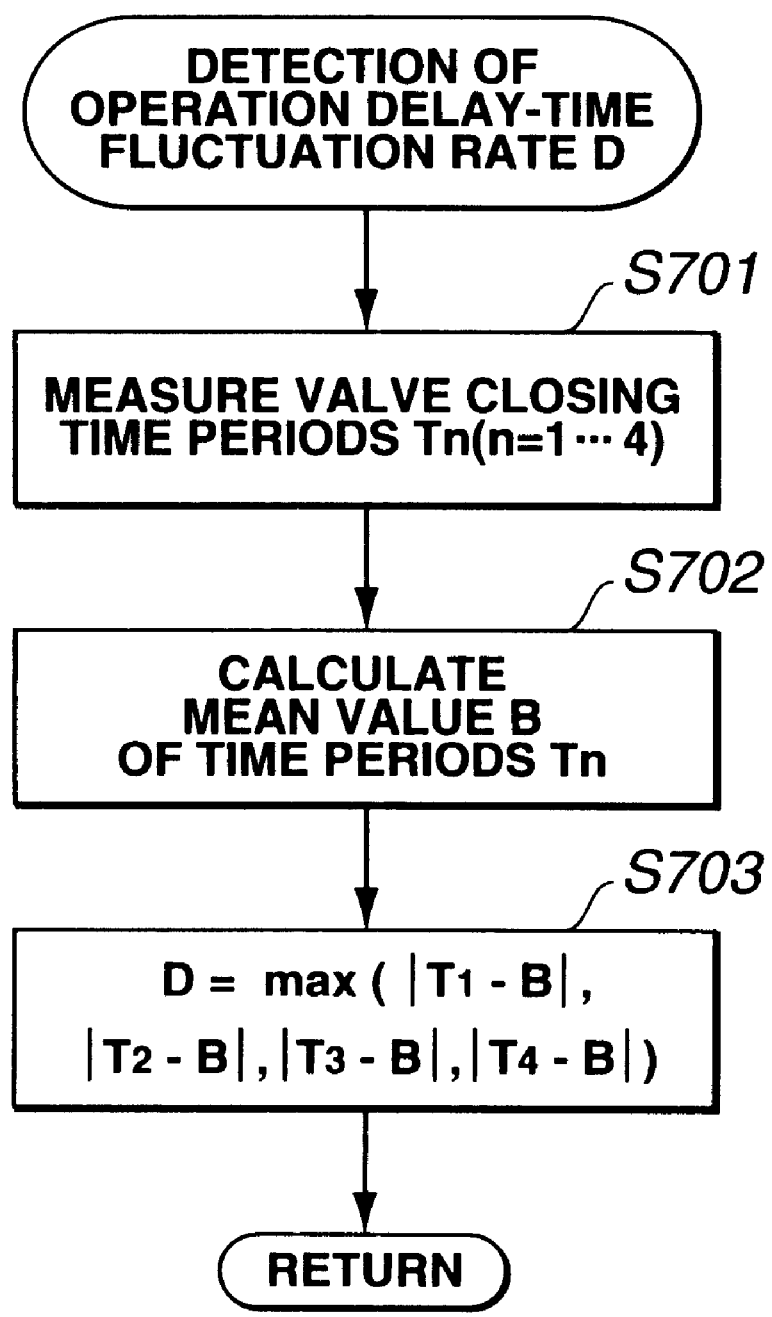
FIG. 5 is a flow chart illustrating an example of a valve operation delay-time fluctuations detection routine or a valve operation delay-time fluctuation rate (D) arithmetic-calculation routine.
Figure 6:
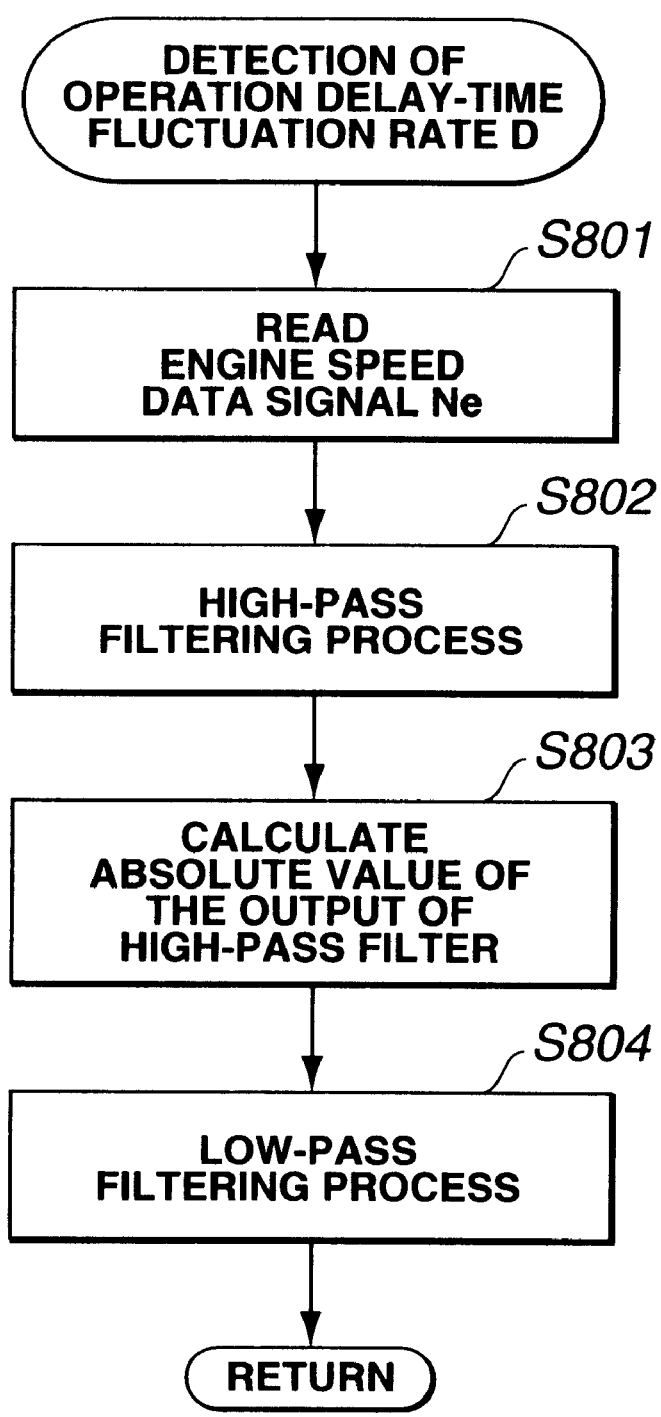
FIG. 6 is a flow chart illustrating another example of a valve operation delay-time fluctuations detection routine or a valve operation delay-time fluctuation rate (D) arithmetic-calculation routine.

In step S501, valve closing time periods Tn of the intake valve unit 108 of each engine cylinder are detected or measured, and then a valve operation delay-time fluctuation rate D, which will be fully described later by reference to the flow chart shown in FIG. 5, is arithmetically calculated on the basis of the detected intake-valve closing time periods Tn (n=1, . . . , 4). In the shown embodiment, n is set at "4", because the intake-air quantity control apparatus is exemplified in an in-line four-cylinder internal combustion engine. Instead of the intake-valve closing time periods Tn, intake-valve opening time periods of each engine cylinder may be detected so as to calculate or estimate the valve operation delay-time fluctuation rate. Alternatively, to enhance the accuracy of arithmetic-calculation or estimation of the operation delay-time fluctuation rate, the intake-valve closing time periods Tn and the intake-valve opening time periods may be all detected and used by the ECU. In step S502, a desired quantity of intake air entering the engine cylinders is arithmetically calculated on the basis of engine operating conditions containing engine speed and engine load. The details of the arithmetic calculation for the desired intake-air quantity (corresponding to a desired volumetric flow rate QHO) will be discussed later in reference to the flow chart shown in FIG. 7. In step S503, a desired internal pressure Pt in the intake-air pipe 102 is determined or arithmetically calculated on the basis of at least the engine temperature (the coolant temperature Tw). In step S504, the desired internal pressure Pt is compensated for on the basis of the valve operation delay-time fluctuation rate D calculated through step S501 to produce a compensated internal pressure Pc. Thereafter, in step S505, a desired throttle opening TVO of the electronically-controlled throttle valve 106 is arithmetically calculated on the basis of both the compensated internal pressure Pc and the desired intake-air quantity (corresponding to the desired volumetric flow rate QHO). In step S506, a desired intake-valve opening time period (that is, a desired intake-valve open timing and a desired intake-valve closure timing for the intake valve unit 108) is arithmetically calculated on the basis of both the compensated internal pressure Pc and the desired intake-air quantity (corresponding to the desired volumetric flow rate QHO).

Figure 4:
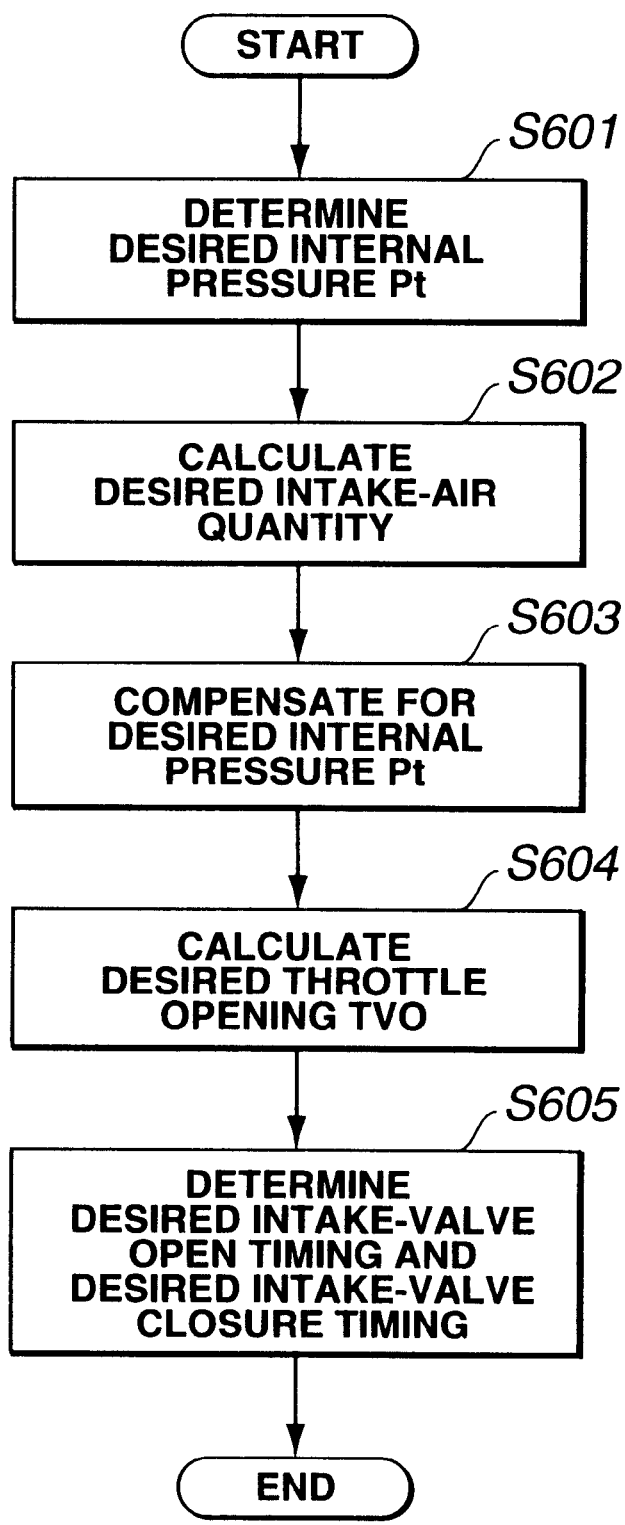
FIG. 4 is a flow chart illustrating a second desired-intake-valve-open-timing plus desired-intake-valve-closure-timing arithmetic-calculation routine.

Referring now to FIG. 4. there is shown the second desired-intake-valve-open-timing plus desired-intake-valve-closure-timing arithmetic-calculation routine for the intake valve unit 108.

Figure 7:
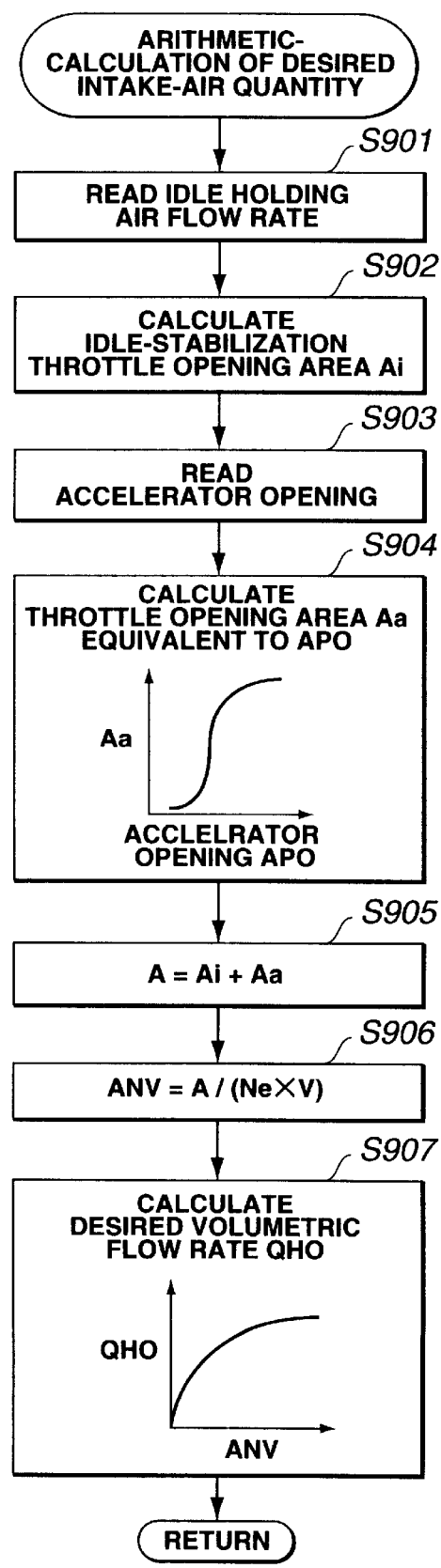
FIG. 7 is a flow chart illustrating a desired intake-air quantity (corresponding to a desired volumetric flow rate QHO) arithmetic-calculation routine.

In step S601, a desired internal pressure Pt in the intake-air pipe 102 is determined or arithmetically calculated on the basis of at least the engine temperature (the coolant temperature Tw). In step S602, a desired quantity of intake air entering the engine cylinders is arithmetically calculated on the basis of engine speed and engine load, in accordance with the flow chart as shown in FIG. 7. In step S603, the desired internal pressure Pt is compensated for on the basis of the desired intake-air quantity (corresponding to a desired volumetric flow rate QHO) to produce a compensated internal pressure Pc. The details of the compensation for the desired internal pressure Pt based on the desired intake-air quantity will be herebelow described in reference to the flow chart of FIG. 11. In step S604, a desired throttle opening TVO of the throttle valve 106 is arithmetically calculated on the basis of both the compensated internal pressure Pc and the desired intake-air quantity (corresponding to the desired volumetric flow rate QHO). In step S605, a desired intake-valve opening time period (that is, a desired intake-valve open timing and a desired intake-valve closure timing for the intake valve unit 108) is arithmetically calculated on the basis of both the compensated internal pressure Pc and the desired intake-air quantity (corresponding to the desired volumetric flow rate QHO), in the same manner as step S506 of FIG. 3.

Referring to FIG. 5, there is shown the intake-valve operation delay-time fluctuation rate (D) arithmetic-calculation routine. In step S701, the intake-valve closing time periods Tn ($T_1$, $T_2$, $T_3$, $T_4$) are measured or detected for each engine cylinder, by using input information signals generated from the displacement sensors 217 mounted on each o the intake valve units 108, representative of the axial displacements (the actual valve lifts) of the valve portions 202 of the intake valve units 108. The previously-noted intake-valve closing time period Tn (n denotes a cylinder number) is defined as a time interval from a time when the ECU 113 outputs a control command signal indicative of initiation of a valve closing action to the intake valve unit 108 to a time when the valve portion 202 of the intake valve unit 108 actually starts the valve closing action. Alternatively, the intake-valve closing time period Tn may be defined as a time interval from a time when the ECU 113 outputs a control command signal indicative of initiation of a valve closing action to the intake valve unit 108 to a time when the valve portion 202 of the intake valve unit 108 actually moves in a direction closing the port 201a and then reaches a predetermined axial displacement or a predetermined valve lift such as a valve fully-closed position. As a modification, the intake-valve opening time period may be used in lieu of the intake-valve closing time period Tn. In such a case, the intake-valve opening time period is defined as a time interval from a time when the ECU 113 outputs a control command signal indicative of initiation of a valve opening action to the intake valve unit 108 to a time when the valve portion 202 of the intake valve unit 108 actually starts the valve opening action. In order to enhance the accuracy of arithmetic-calculation for the intake-valve operation delay-time fluctuation rate D, the ECU 113 may use the intake-valve opening time period as well as the intake-valve closing time period Tn. In order to highly enhance the accuracy of arithmetic-calculation for the valve operation delay-time fluctuation rate, the ECU 113 may consider the exhaust-valve operation delay-time fluctuation rate as well as the intake-valve operation delay-time fluctuation rate D, since the intake-air quantity is also affected by a delay in opening and/or closing operations of the exhaust valve unit 109. In step S702, a mean value B (=($T_1+T_2+T_3+T_4$)/4 in simple-average method) of the intake-valve closing time periods $T_1$, $T_2$, $T_3$, and $T_4$ of each engine cylinder is arithmetically calculated. In step S703, an absolute value |Tn−B | of a deviation (Tn−B) of the intake-valve closing time period Tn of each engine cylinder from the mean value B is calculated. Then, the intake-valve operation delay-time fluctuation rate D is determined as a highest one of these absolute values $|T_1-B|$, $|T_2-B|$, $|T_3-B|$ and $|T_4-B|$ by means of a so-called select-HIGH process max($|T_1-B|$, $|T_2-B|$, $|T_3-B|$, $|T_4-B|$).

In step S701 of FIG. 5, the intake-valve closing time period Tn is measured or detected by using the output signal from the displacement sensor 217 located on each of the engine cylinders. As may be appreciated, the amount of intake air introduced into the engine also fluctuates or varies in the presence of fluctuations in the intake-valve closing time period Tn. As a result of this, the engine speed Ne also fluctuates. For the reasons discussed above, the previously-noted valve operation delay-time fluctuation rate D can be estimated from the fluctuations in the engine speed Ne (see the flow chart of FIG. 6). According to the other valve operation delay-time fluctuations detection routine shown in FIG. 6, first of all, in step S801, the engine speed data signal Ne is read. In step S802, a high-pass filtering process is made to the engine speed data signal Ne read through step S801, so as to transmit all frequencies above a given cutoff frequency and to substantially remove or attenuate all other low- and middle-frequency components from the engine speed data signal Ne. For example, a given cutoff frequency is set at 1 Hz, and the high-pass filtering process is executed in accordance with the following expression (1).

$$y_{(k)}=0.9695312529 \times \{u_{(k)}-u_{(k-1)}\}+0.9390625058 \times y_{(k-1)} \quad (1)$$

where $U_{(k)}$ denotes a more recent value of the input into the high-pass filter, $u_{(k-1)}$ denotes a previous value of the input into the high-pass filter, $Y_{(k)}$ denotes a more recent value of the output from the high-pass filter, and $y_{(k-1)}$ denotes a previous value of the output from the high-pass filter.

In step S803, an absolute value of the output of the high-pass filter is arithmetically calculated. In step S804, a low-pass filtering process is made to a signal representative of the absolute value of the output of the high-pass filter, so as to transmit all frequencies below a given cutoff frequency and to substantially remove or attenuate all other middle- and high-frequency components from the input data signal indicative of the absolute value. For example, a cutoff frequency for the low-pass filter is set at 10 Hz, and the low-pass filtering process is executed in accordance with the following expression (2), so as to integrate input data for a predetermined time duration such as 10 seconds.

$$y_{(k)}=0.2452372753 \times \{u_{(k)}-u_{(k-1)}\}+0.5095254495 \times y_{(k-1)} \quad (2)$$

where $u_{(k)}$ denotes a more recent value of the input of the low-pass filter, $u_{(k-1)}$ denotes a previous value of the input of the low-pass filter, $y_{(k)}$ denotes a more recent value of the output of the low-pass filter, and $y_{(k-1)}$ denotes a previous value of the output of the low-pass filter. The integrated value obtained through the low-pass filter is set as the intake-valve operation delay-time fluctuation rate D.

Referring now to FIG. 7, there is shown the desired intake-air quantity arithmetic-calculation routine related to step S502 of FIG. 3 and step S602 of FIG. 4, and executed by the ECU 113 incorporated in the intake-air quantity control apparatus of the embodiment. As detailed hereunder, the desired intake-air quantity is arithmetically calculated or estimated on the basis of engine operating conditions such as engine speed (Ne) and engine load (e.g., APO or ANV).

In step S901, an idle-holding air flow rate, corresponding to a required air flow rate needed to hold an engine idling operation, is read or extracted from a predetermined or preprogrammed look-up table stored in the memory. In step S902, an idle-stabilization throttle opening area Ai is arithmetically calculated by multiplying the idle-holding air flow rate read at step S901 with a coefficient. The coefficient is retrieved on the basis of the idle-holding air flow rate determined through step S901 from a predetermined or preprogrammed characteristic map showing how a throttle opening area Ai has to be varied relative to a flow rate of air passing through the throttle valve in sonic flow. In step S903, the accelerator opening APO, detected by the accelerator opening sensor 117, is read. In step S904, an equivalent throttle opening area Aa corresponding to the accelerator opening APO is arithmetically calculated or retrieved on the basis of the latest up-to-date accelerator opening indicative data APO, from a predetermined or preprogrammed accelerator-opening(APO)/throttle-opening-area (Aa) conversion map as indicated in the block of step S904 of FIG. 7. In step S905, a total throttle opening area A (=Ai+Aa) is arithmetically calculated by adding the idle-stabilization throttle opening area Ai to the equivalent throttle opening area Aa. In step S906, a variable parameter ANV is arithmetically calculated by an expression ANV=A/(Ne×V), where A denotes the total throttle opening area, Ne denotes the engine speed, and V denotes a displacement of the engine. Finally, in step S907, a desired volumetric flow rate QHO (corresponding to the desired intake-air quantity) is arithmetically calculated or retrieved on the basis of the variable parameter ANV from a predetermined or preprogrammed conversion map stored in the computer memory and showing how the desired volumetric flow rate QHO has to be varied relative to the variable parameter ANV. In the shown embodiment, the conversion map of step S907 is preprogrammed on the assumption that the intake-valve open timing (IVO) is set at T.D.C. (top dead center), whereas the intake-valve closure timing (IVC) is set at B.D.C. (bottom dead center).

Figure 8:
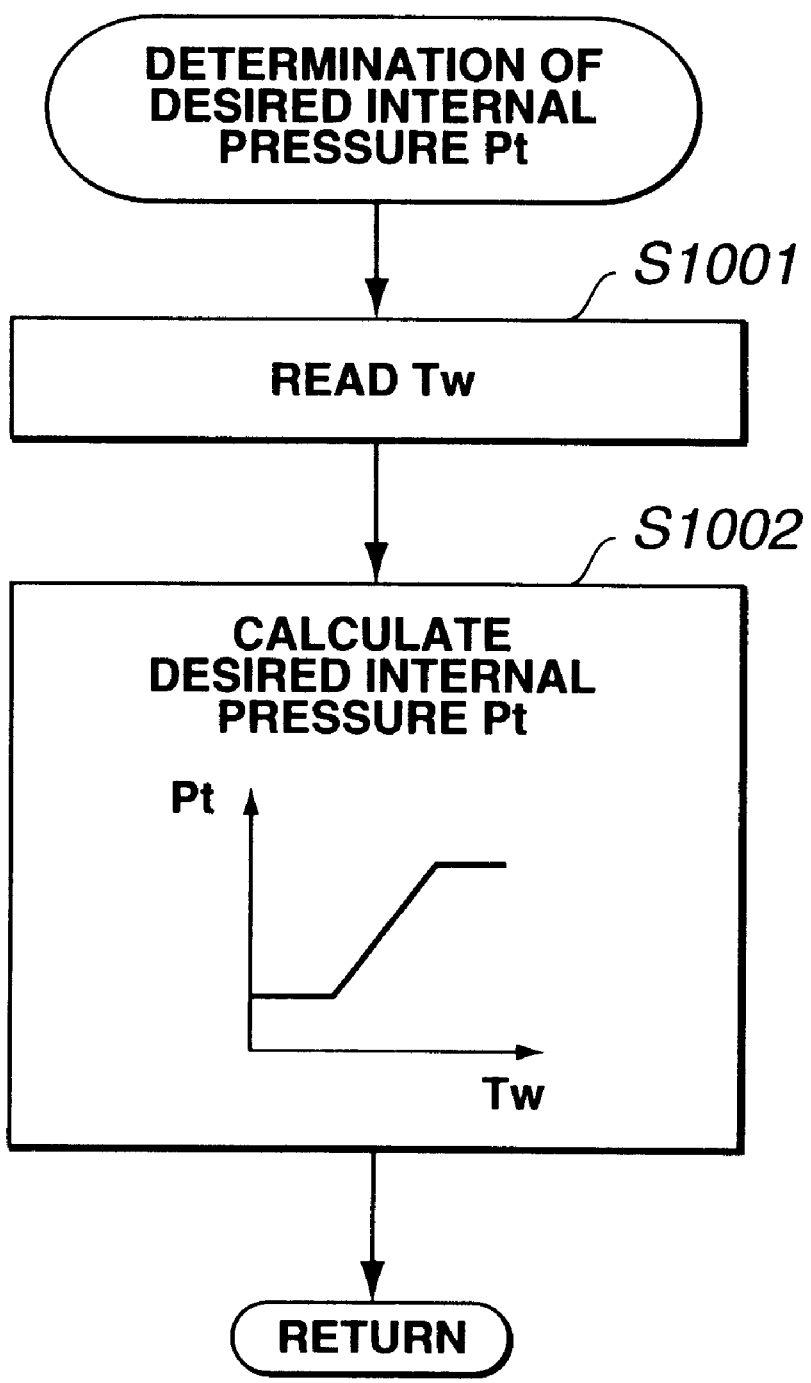
FIG. 8 is a flow chart illustrating a desired intake-pipe internal pressure (Pt) arithmetic-calculation routine.

Referring now to FIG. 8, there is shown the desired internal pressure (Pt) arithmetic-calculation routine related to step S503 of FIG. 3 and step S601 of FIG. 4.

In step S1001, a predetermined operating parameter, such as the engine temperature, that is, the engine coolant temperature Tw, detected by the engine temperature sensor 115, is read. In step S1002, the desired internal pressure Pt in the intake-air pipe is arithmetically calculated or retrieved on the basis of the engine temperature Tw from a predetermined desired-internal-pressure versus engine-temperature characteristic map showing how the desired internal pressure Pt has to be varied relative to the engine temperature Tw. In the system of the embodiment, the desired internal pressure Pt is set at a comparatively low pressure level such as −200 mmHg during cold engine operation, in order to enhance combustion stability by increasing the flow velocity of air-fuel and thus producing the strengthened gas flow. Conversely, during engine warm-up, the desired internal pressure Pt is set at a comparatively high pressure level such as −50 mmHg close to atmospheric pressure, in order to improve fuel economy by reducing the pumping loss. As can be appreciated from the Pt-Tw characteristic map indicated in the block of step S1002 of FIG. 8, the desired internal pressure Pt is fixed to the predetermined low pressure level for example −200 mmHg during the cold engine operation (that is, at engine coolant temperatures below 0° C.), and fixed to the predetermined high pressure level for example −50 mmHg during the engine warm-up (that is, at engine coolant temperatures above 80° C.). During a transition period from the cold engine condition to the warm-up condition, that is, at the engine coolant temperatures greater than 0° C. and less than 80° C., the desired internal pressure Pt linearly increases as the engine coolant temperature Tw rises.

Figure 9:
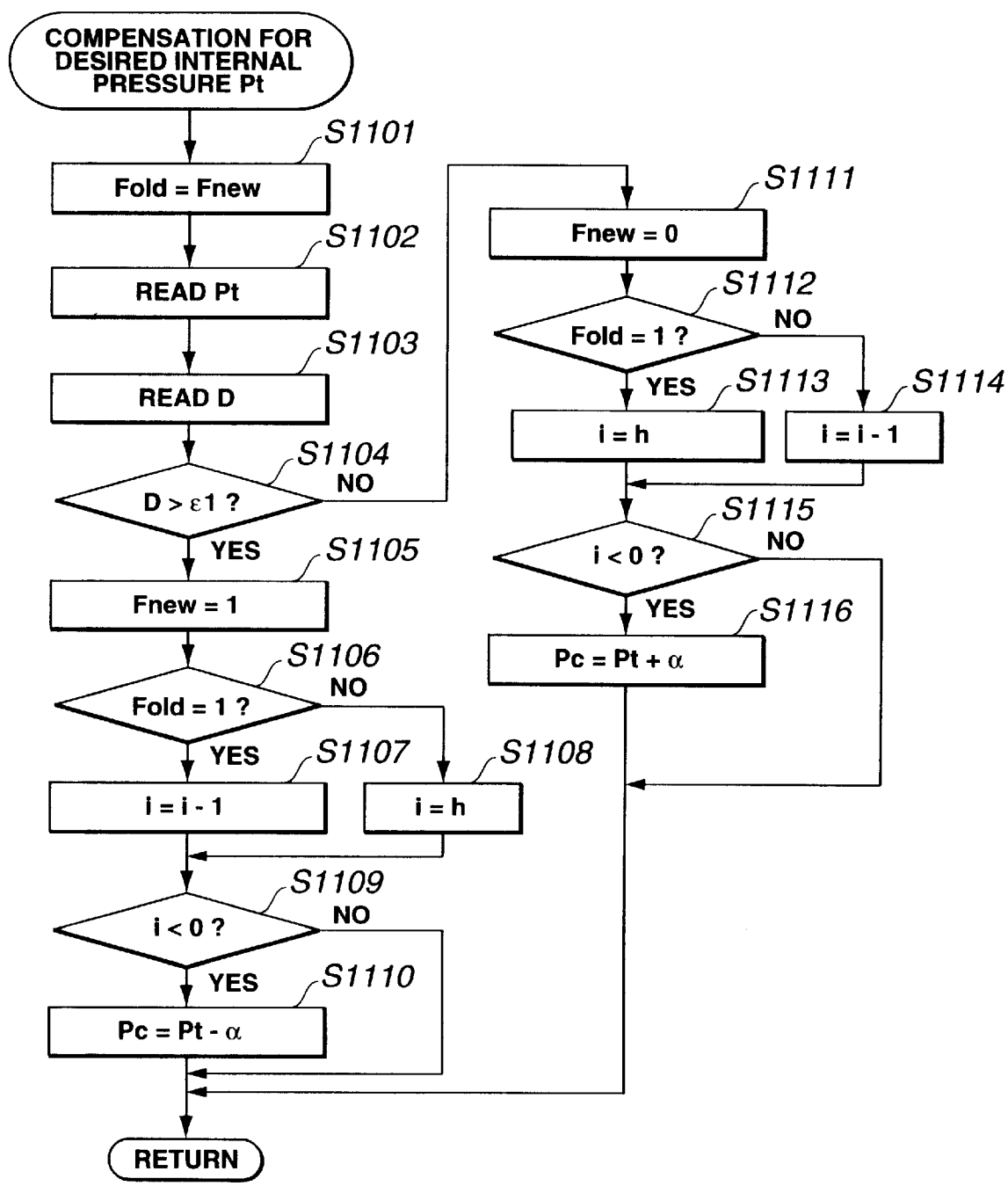
FIG. 9 is a flow chart illustrating a compensation routine for the desired intake-pipe internal pressure (Pt) based on the valve operation delay-time fluctuation rate (D).

Referring now to FIG. 9, there is shown the desired intake-pipe internal pressure (Pt) compensation routine related to step S504 of FIG. 3.

In step S1101, a value of a flag $F_{old}$ is updated by a value of a flag $F_{new}$. An initial value of the flag $F_{old}$ is "0". In step S1102, the desired internal pressure Pt is read. In step S1103, the intake-valve operation delay-time fluctuation rate D is read. In step S1104, the intake-valve operation delay-time fluctuation rate D is compared to a predetermined threshold value $\epsilon 1$. When the answer to step S1104 is in the affirmative (D>$\epsilon 1$), the ECU 113 decides that the intake-valve delay-time fluctuations are great, and thus the routine proceeds to a series of steps S1105–S1110. In step S1105, the flag $F_{new}$ is set at "1". In step S1106, a check is made to determine whether the flag $F_{old}$ is set at "1". In case of $F_{old}$=1, step S1107 occurs. In step S1107, a variable i is decremented by "1". Conversely, when the answer to step S1106 is in the negative ($F_{old}$=0), step S1108 occurs. In step S1108, the variable i is set at a predetermined constant or an initial value h. In step S1109, a test is made to determine whether the variable i is less than "0". When the answer to step S1109 is affirmative (i<0), step S1110 occurs. In step S1110, a compensated intake-air pipe internal pressure (simply a compensated internal pressure) Pc is arithmetically calculated by subtracting a predetermined constant $\alpha$ from the desired internal pressure Pt according to the expression Pc=Pt−$\alpha$. When the answer to step S1109 is negative (i$\geq$0), the routine returns to the main program not through step S1110. That is, steps S1107, S1108 and S1109 functions as a timer. As set forth above, in the event that the intake-valve operation delay-time fluctuations are continually kept great (D>$\epsilon 1$) for a predetermined time period (until the variable i set at the initial value h reaches a negative value), the desired internal pressure Pt is decreasingly corrected by the predetermined constant $\alpha$ through a series of steps S1105–S1110. For example, assuming that the predetermined constant (the initial value) h is set at "300", 3 seconds have to be elapsed until the counted value of the timer becomes a negative value, since the product of the initial value of 300 and the predetermined time interval of 10 milliseconds (each arithmetic-calculation cycle) is 3 seconds. Thus, in case of h=300, if the condition of D>$\epsilon 1$ is satisfied continuously for three seconds, the routine advances to step S1110, so as to decreasingly compensate for the desired internal pressure Pt by the predetermined constant $\alpha$. On the other hand, when the answer to step S1104 is negative (D$\leq\epsilon 1$), the routine proceeds to a series of steps S1111–S1116. In step S1111, the flag $F_{new}$ is set at "0". In step S1112, a check is made to determine whether the flag $F_{old}$ is set at "1". In case of $F_{old}$=1, step S1113 occurs. In step S1113, a variable i is set at the initial value such as "300". Conversely, when the answer to step S1112 is in the negative ($F_{old}$=0), step S1114 occurs. In step S1114, the variable i is decremented by "1". In step S1115, a test is made to determine whether the variable i is less than "0". When the answer to step S1115 is affirmative (i<0), step S1116 occurs. In step S1116, a compensated internal pressure Pc is arithmetically calculated by adding a predetermined constant $\alpha$ to the desired internal pressure Pt according to the expression Pc=Pt+$\alpha$. When the answer to step S1115 is negative (i$\geq$0), the routine returns to the main program not through step S1116. That is, steps S1113, S1114 and S1115 functions as a timer. As set forth above, in the event that the intake-valve operation delay-time fluctuations are kept small (D$\leq\epsilon 1$) for the predetermined time period such as 3 seconds, the desired internal pressure Pt is increasingly corrected by the predetermined constant $\alpha$ through a series of steps S1111–S1116. Thus, in case of h=300, if the condition of D$\leq\epsilon 1$ is satisfied continuously for three seconds, the routine advances to step S1116, so as to increasingly compensate for the desired internal pressure Pt by the predetermined constant $\alpha$. That is to say, according to the desired internal pressure (Pt) compensation processing shown in FIG. 9, as appreciated from the characteristic map shown in FIG. 14, the compensated intake-pipe internal pressure Pc does not vary depending on engine load. In the compensation processing of FIG. 9, the compensated internal pressure Pc varies depending upon only the operation delay-time fluctuation rate D, so that the compensated internal pressure Pc gradually decreases as the intake-valve operation delay-time fluctuation rate D increases. In the compensation processing shown in FIG. 9, although the magnitude of the intake-valve operation delay-time fluctuation rate D is compared with only one decision criterion, namely, the predetermined threshold value $\epsilon 1$, the ECU 113 may use two or more decision criteria, and then produce a more properly compensated internal pressure Pc finely corrected on the basis of the decision results. On the other hand, if the intake-valve operation delay-time fluctuation rate D is great and thus the intake-pipe internal pressure is adjusted to a low level according to the internal pressure compensation of FIG. 9, then the intake-valve opening time period has to be lengthened in order to obtain the desired intake-air quantity by virtue of the intake-valve open timing plus closure timing control. With the lengthened intake-valve opening time period, there is a tendency for the ratio of the error span of the intake-valve operation delay-time fluctuations to the total intake-valve opening time period to decrease (see FIG. 17B). This effectively suppresses fluctuations in the intake-air quantity occurring due to the intake-valve operation delay-time fluctuations.

Figure 10:
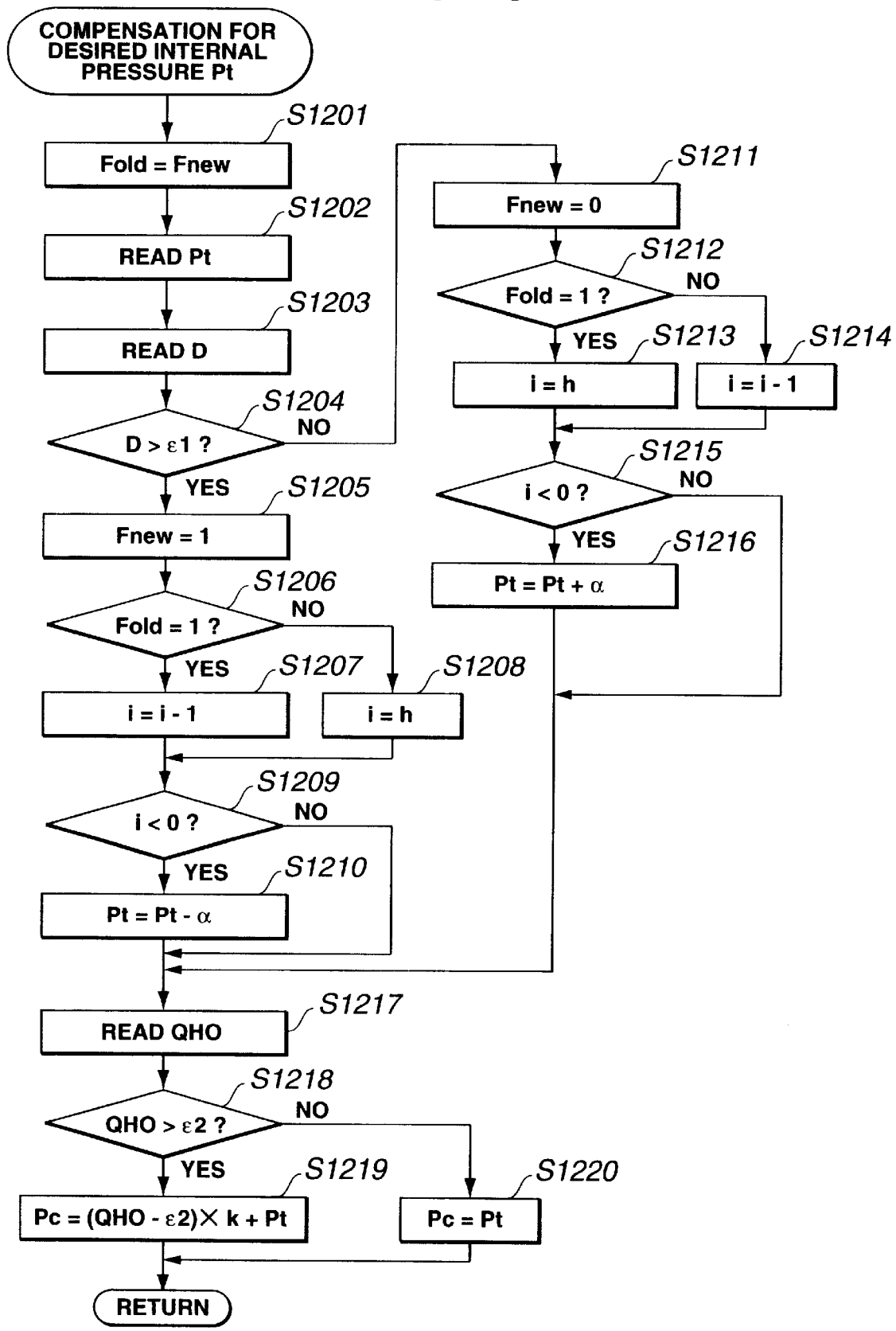
FIG. 10 is a flow chart illustrating a compensation routine for the desired intake-pipe internal pressure (Pt) based on both the valve operation delay-time fluctuation rate (D) and the desired intake-air quantity (corresponding to the desired volumetric flow rate QHO).

Referring now to FIG. 10, there is shown a modified compensation processing for the desired internal pressure (Pt). The modified compensation routine of FIG. 10 is slightly different from the routine of FIG. 9, in that the desired intake-pipe internal pressure Pt is compensated for on the basis of the desired intake-air quantity (corresponding to the desired volumetric flow rate QHO) as well as the intake-valve operation delay-time fluctuation rate D. That is, compensation for the desired internal pressure Pt based on the desired intake-air quantity (QHO) (see steps S1217–S1220) is further added to compensation for the desired internal pressure Pt based on the intake-valve operation delay-time fluctuation rate D (see steps S1201–S1216). Thus, detailed description of the same steps (S1201–S1216) as steps S1101–S1116 shown in FIG. 9 will be omitted because the above description thereon seems to be self-explanatory.

In step S1217, the desired volumetric flow rate QHO is read out. In step S1218, the desired volumetric flow rate QHO is compared with a predetermined threshold value $\epsilon 2$. A test is made to determine whether the desired volumetric flow rate QHO exceeds the predetermined threshold value $\epsilon 2$. The desired volumetric flow rate QHO is generally regarded as engine load, and corresponds to the desired intake-air quantity. In case of QHO>$\epsilon 2$, that is, in presence of high engine-load requirement, the routine proceeds to step S1219. In step S1219, a compensated intake-pipe internal pressure Pc is produced by adding a correction value, which is obtained by multiplying a predetermined correction factor k with the deviation (QHO−ε2) between the desired volumetric flow rate QHO and the predetermined threshold value ε2, to desired internal pressure Pt. That is, the compensated internal pressure Pc is arithmetically calculated from the following expression.

$$Pc=(QHO-\epsilon 2)\times k+Pt$$

Figure 15:
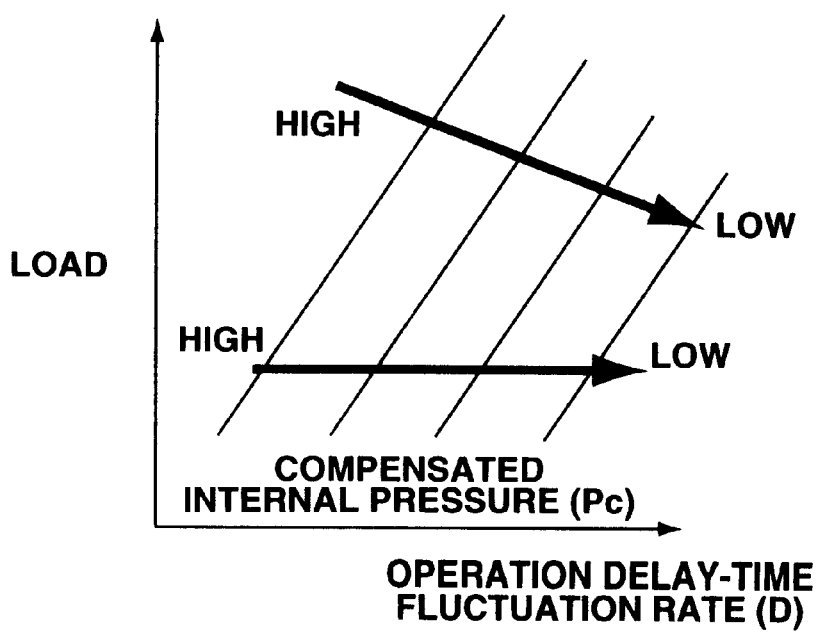
FIG. 15 is a characteristic map illustrating the relationship among the compensated intake-pipe internal pressure (Pc), the engine load, and the valve operation delay-time fluctuation rate (D), related to the compensation routine of FIG. 10 for the desired intake-pipe internal pressure (Pt) based on both the valve operation delay-time fluctuation rate (D) and the desired intake-air quantity (corresponding to the desired volumetric flow rate QHO).

On the other hand, if the answer to step S1218 is negative (QHO≦ε2), that is, in presence of low engine-load requirement, step S1220 occurs. In step S1220, without any compensation for the desired internal pressure Pt, the desired internal pressure Pt is set as the final internal pressure Pc. That is to say, according to the desired internal pressure (Pt) compensation processing shown in FIG. 10, as appreciated from the characteristic map shown in FIG. 15, if the engine load (estimated by the desired volumetric flow rate QHO) is less than the predetermined threshold value (ε2), the desired internal pressure Pt varies depending on the intake-valve operation delay-time fluctuation rate D, irrespective of the engine load (QHO), so that the desired internal pressure Pt decreases as the intake-valve operation delay-time fluctuation rate D increases. Conversely, if the engine load (QHO) is above the predetermined threshold value (ε2), the desired internal pressure Pt varies depending upon the engine load (QHO) as well as the intake-valve operation delay-time fluctuation rate D, so that the desired internal pressure Pt decreases as the intake-valve operation delay-time fluctuation rate D increases, and so that the desired internal pressure Pt increases as the engine load demand increases. As may be appreciated, in case of a high engine-load demand and a long intake-valve opening time period, the total intake-valve opening time period may be almost unaffected by the intake-valve operation delay-time fluctuations, even when the intake-valve operation delay-time fluctuation rate D is great. Thus, when the above-mentioned two conditions (high load demand and long intake-valve opening time period) are simultaneously satisfied, there is less necessity to reduce the desired internal pressure Pt. According to the modified compensation processing for the desired internal pressure Pt of FIG. 10, the desired internal pressure Pt can be compensated for depending on the engine load (QHO) in case of the same intake-valve operation delay-time fluctuation rate D. This prevents the desired internal pressure Pt from being adjusted to an undesiredly low level, thus ensuring the reduced pumping loss.

Actually, it is preferable that the desired intake-pipe internal pressure (Pt) compensation processing based on the intake-valve operation delay-time fluctuation rate D (see steps S1101–S1116 of FIG. 9 and steps S1201–S1216 of FIG. 10), is performed when the desired internal pressure Pt is close to the atmospheric pressure. There is no necessity for such compensation for the desired internal pressure Pt when the desired internal pressure Pt has already been set at a low pressure level in response to a vehicle-deceleration requirement, because the intake-valve operation delay-time fluctuation rate D based on the actual valve lift indicative signal from the displacement sensor (see step S701 of FIG. 5) cannot be varied by compensating for the internal pressure in the intake pipe during the deceleration requirement.

Figure 11:
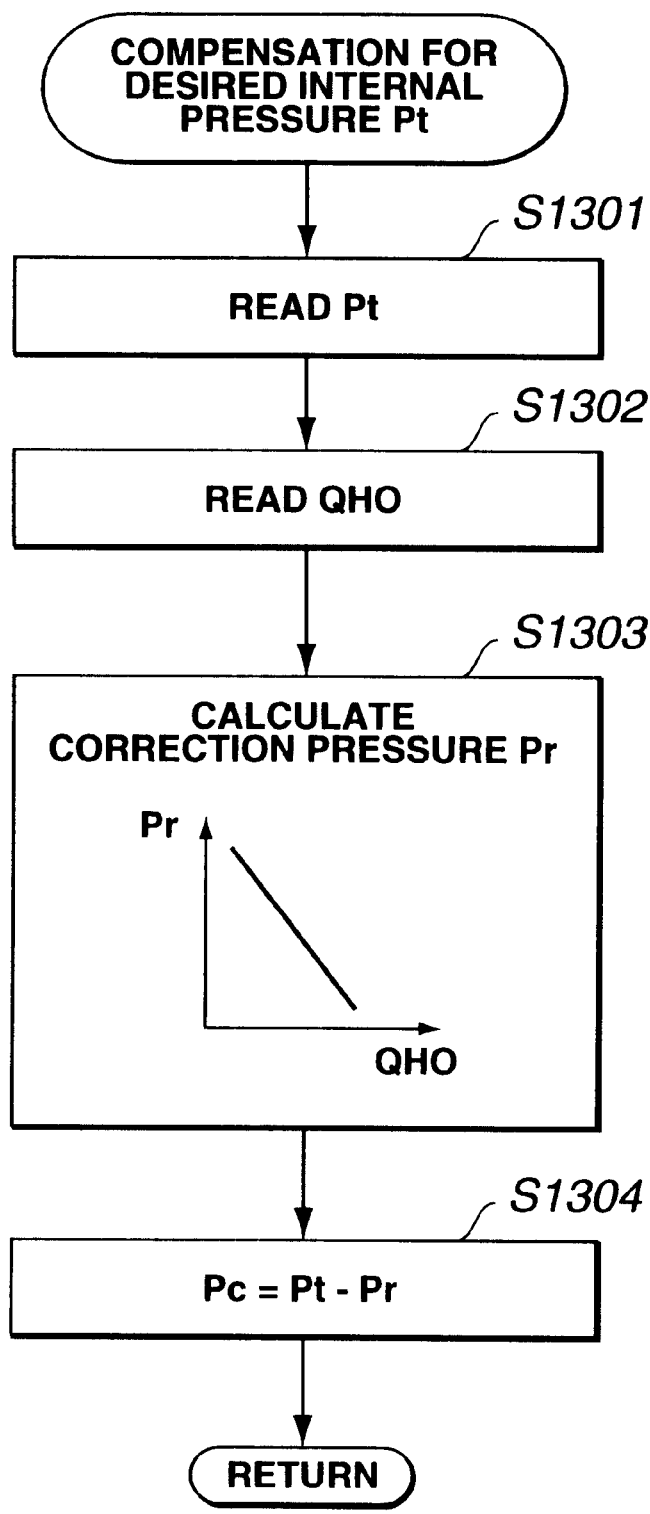
FIG. 11 is a flow chart illustrating a compensation routine for the desired intake-pipe internal pressure (Pt) based on the desired intake-air quantity (the desired volumetric flow rate QHO).
Figure 12:
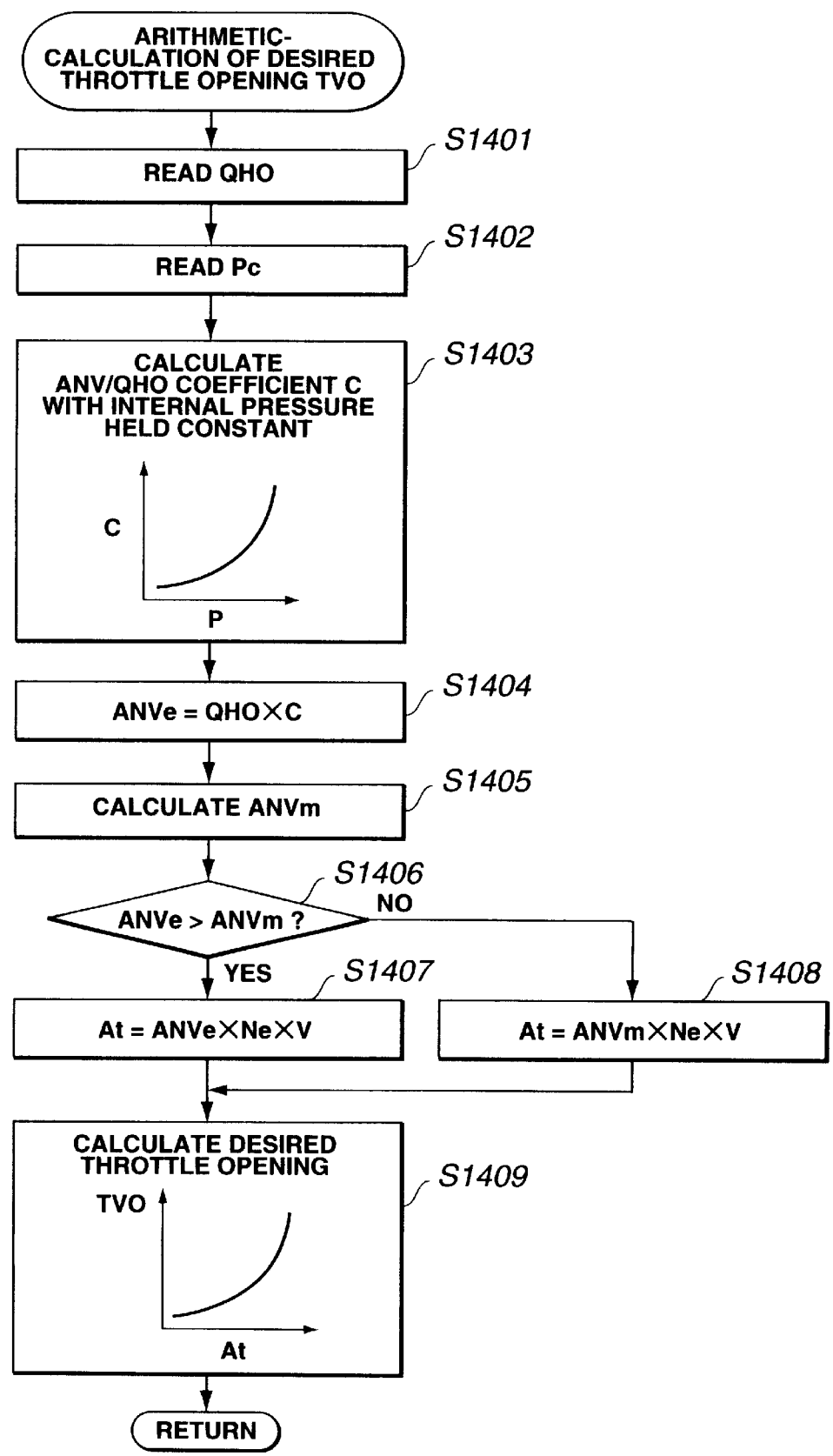
FIG. 12 is a flow chart illustrating a desired throttle-opening (TVO) arithmetic-calculation routine.

Referring now to FIG. 11, there is shown the desired intake-pipe internal pressure (Pt) compensation routine related to step S603 of FIG. 4.

In step S1301, the desired internal pressure Pt is read. In step S1302, the desired volumetric flow rate QHO is read. In step S1303, a correction pressure value Pr is arithmetically calculated or retrieved on the basis of the desired volumetric flow rate QHO from a preprogrammed characteristic map showing how the correction pressure value Pr has to be varied relative to the desired volumetric flow rate QHO. In step S1304, the corrected internal pressure (the final internal pressure) Pc is arithmetically calculated by subtracting the correction pressure value Pr from the desired internal pressure Pt. That is, the corrected internal pressure (the final pressure value) Pc is obtained by the expression Pc=Pt−Pr. As can be appreciated from the characteristic map shown in step S1303 of FIG. 11, the correction pressure value Pr varies in inverse-proportion to the desired volumetric flow rate QHO (the engine load), so that the correction pressure value Pr gradually decreases as the desired volumetric flow rate QHO increases. According to the desired internal pressure (Pt) compensation processing shown in FIG. 11, the desired intake-pipe internal pressure Pt is not dependent on the intake-valve operation delay-time fluctuation rate D. In the compensation routine of FIG. 11, the desired internal pressure Pt varies depending on only the desired volumetric flow rate QHO (the engine load). The engine-load dependent internal-pressure compensation routine shown in FIG. 11 is designed, so that the desired internal pressure Pt is corrected toward a lower pressure level as the engine load (QHO) decreases (in other words, so that the desired internal pressure Pt is corrected toward a higher pressure level as the engine load (QHO) increases).

Figure 14:
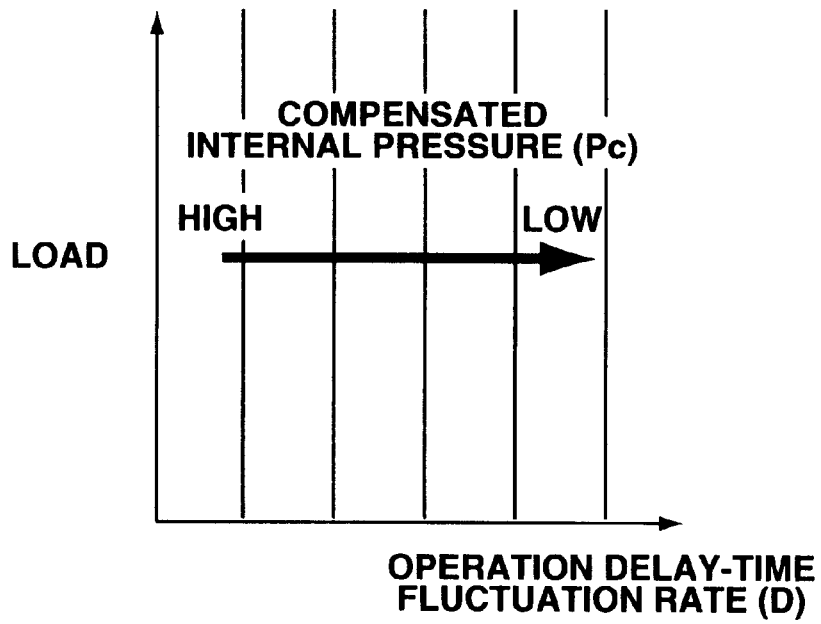
FIG. 14 is a characteristic map illustrating the relationship among the compensated intake-pipe internal pressure (Pc), the engine load, and the valve operation delay-time fluctuation rate (D), related to the compensation routine of FIG. 9 for the desired intake-pipe internal pressure (Pt) based on the valve operation delay-time fluctuation rate (D).

Referring to FIG. 14, there is shown the desired throttle opening arithmetic-calculation routine related to both step S505 of FIG. 3 and step S604 of FIG. 4.

In step S1401, the desired volumetric flow rate QHO (corresponding to the engine load demand) is read. In step S1402, the compensated internal pressure Pc is read. Then, a series of steps S1403–S1408 follow. The series of steps S1403–S1408 are hereinafter explained in detail by the use of the characteristic curve shown in FIG. 16.

Figure 16:
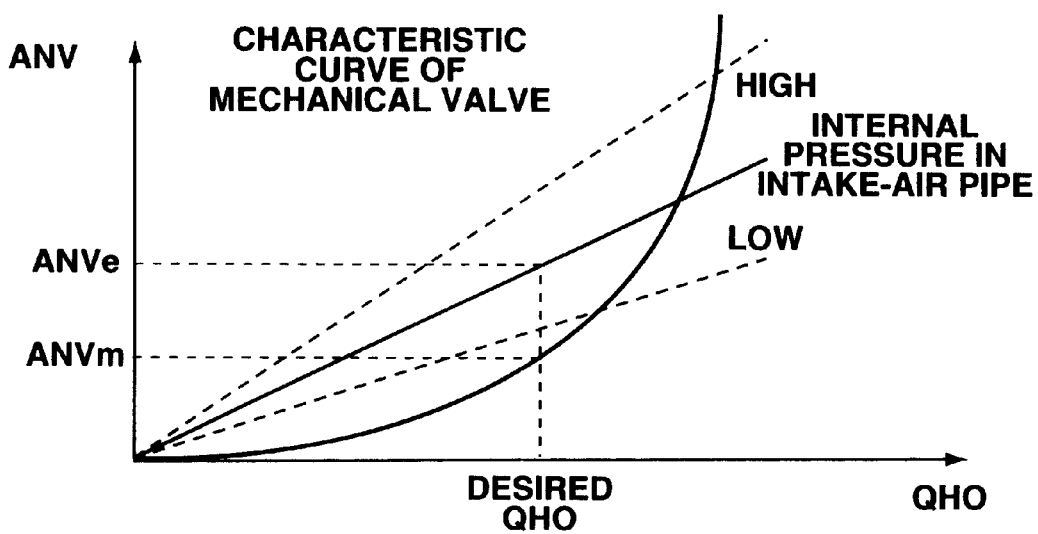
FIG. 16 is a characteristic curve illustrating the correlative relation between a variable parameter ANV ($=A/(Ne \cdot V)$) and the desired volumetric flow rate QHO.

As indicated by the solid straight line of FIG. 16, assuming that the internal pressure in the intake pipe is held constant and thus fixed to a certain pressure value, the variable parameter ANV (=A/(Ne·V)) (exactly, a first variable parameter ANVe) is in proportion to the desired volumetric flow rate QHO. In FIG. 16, the upper straight broken line indicates variations in the first variable parameter ANVe with the intake-pipe internal pressure kept at a comparatively high pressure level, the intermediate straight solid line indicates variations in the first variable parameter ANVe with the intake-pipe internal pressure kept at a comparatively middle pressure level, and the lower straight broken line indicates variations in the first variable parameter ANVe with the intake-pipe internal pressure kept at a comparatively low pressure level. As appreciated, the first variable parameter ANVe has a linear characteristic with respect to the desired volumetric flow rate QHO (the engine load). By virtue of the routine of FIG. 12, the total throttle opening area A (greatly related to the variable parameter ANV) has to be determined, so that the intake-pipe internal pressure is adjusted to the certain pressure (the desired pressure). A quantity of intake air that can be introduced into the engine by way of only the adjustment of the intake-valve open timing (IVO) and the intake-valve closure timing (IVC), is however limited to a maximum intake-air quantity $QHO_{max}$. Therefore, in case that the required intake-air quantity (the desired volumetric flow rate QHO) exceeds the maximum intake-air quantity $QHO_{max}$, the intake-valve closure timing (IVC) is, on one hand, fixed to the bottom dead center (BDC), and the intake-pipe internal pressure value itself is, on the other hand, set at a higher pressure level rather than its desired value by way of a series of steps S1403–S1409 detailed hereunder.

Concretely, in step S1403, a correction factor C is arithmetically calculated or retrieved on the basis of the compensated internal pressure Pc from a preprogrammed characteristic map data showing how the correction factor C has to be varied relative to the intake-pipe internal pressure (exactly, the compensated internal pressure Pc). The correction factor C means an ANV/QHO coefficient with the intake-pipe internal pressure held constant. In other words, the correction factor C corresponds to a rate of change of the variable parameter ANV (=A/(Ne·V)) with respect to the desired volumetric flow rate QHO, whose rate-of-change (ANV/QHO) corresponds to the gradient of the straight line shown in FIG. 16. In step S1404, the variable parameter ANV (=A/(Ne·V)) is arithmetically calculated by multiplying the desired volumetric flow rate QHO by the correction factor C based on the desired internal pressure (the compensated internal pressure Pc). Then, the calculated variable parameter A/(Ne·V) is set at the first variable parameter ANVe of a linear characteristic (see the straight lines shown in FIG. 16). After this, in step S1405, a second variable parameter ANVm is arithmetically calculated or retrieved on the basis of the desired volumetric flow rate QHO from the predetermined characteristic curve (or the mechanical-valve characteristic curve) indicated by the solid curved line of FIG. 16. As appreciated, the second variable parameter ANVm has a non-linear characteristic (corresponding to mechanical valve characteristics) with respect to the desired volumetric flow rate QHO (the engine load). In step S1406, the magnitude of the first variable parameter ANVe calculated by step S1404 is compared with the magnitude of the second variable parameter ANVm calculated by step S1405. When the answer to step S1406 is affirmative (ANVe>ANVm), the routine proceeds to step S1407. In step S1407, the desired throttle opening area At is calculated as the product (ANVe×Ne×V) of the second variable parameter ANVe, the engine speed Ne, and a displacement V of the engine. When the answer to step S1406 is negative (ANVe≦ANVm), step S1408 occurs. In step S1408, the desired throttle opening area At is calculated as the product (ANVm×Ne×V) of the second variable parameter ANVm, the engine speed Ne, and the displacement V of the engine. Thereafter, the routine advances to step S1409. In step S1409, the desired throttle opening area At is converted into a desired throttle opening TVO by way of a predetermined or preprogrammed throttle-opening-area (At) to throttle-opening (TVO) conversion table. Then, the ECU 113 outputs a drive signal corresponding to the desired throttle opening TVO to the electronically-controlled throttle valve 106, so that the actual throttle opening is adjusted toward the desired throttle opening.

Figure 13:
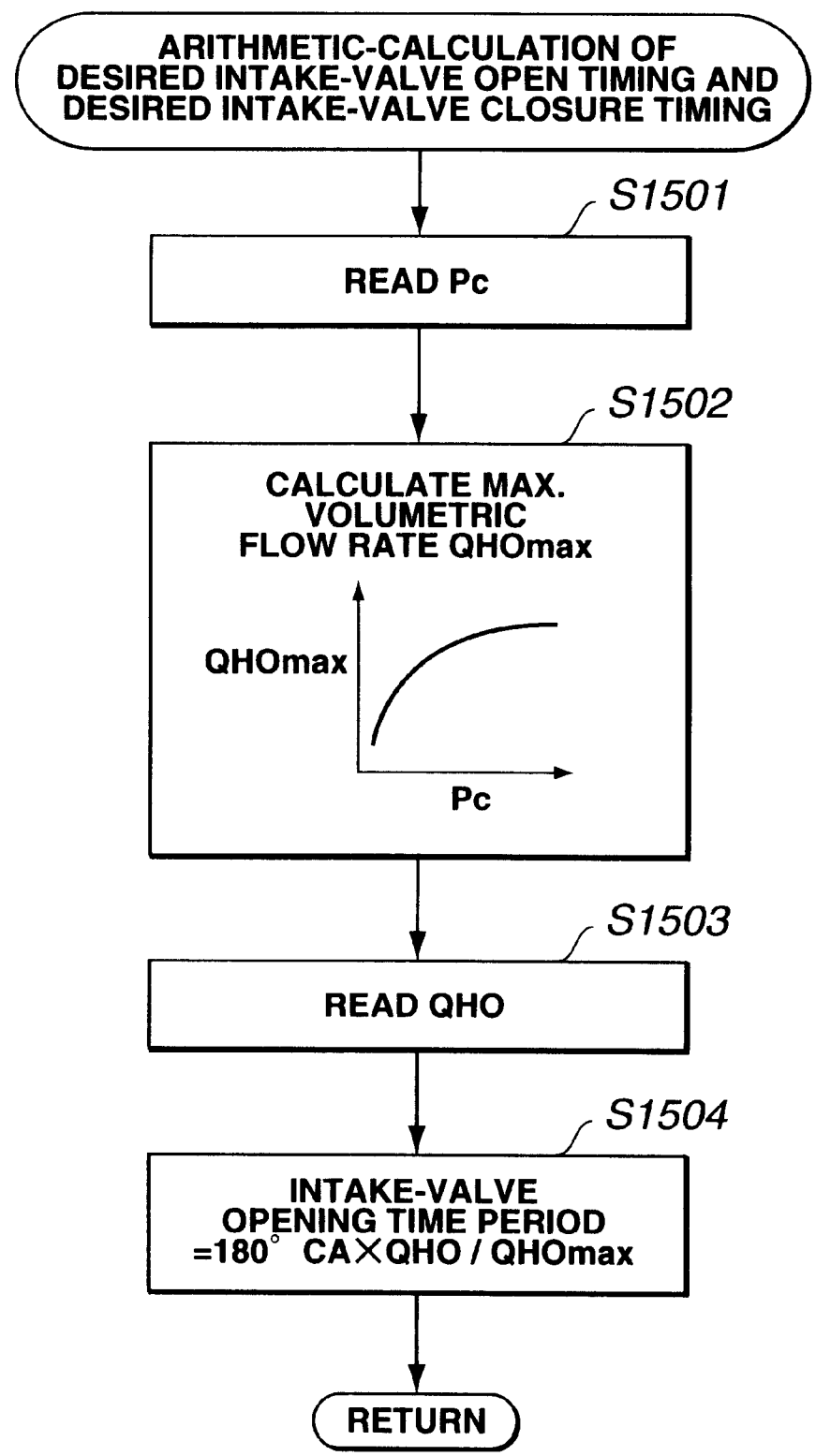
FIG. 13 is a flow chart illustrating an intake-valve opening time period arithmetic-calculation routine.

Referring now to FIG. 13, there is shown the intake-valve opening time period (180°-crank angle×QHO/QHO$_{max}$) arithmetic-calculation routine related to step S506 of FIG. 3 and step S605 of FIG. 4. In the arithmetic-calculation routine of FIG. 13, executed by the intake-air quantity control apparatus of the embodiment, the intake-valve open timing (IVO) is fixed to the top dead center (TDC), and thus only the intake-valve closure timing (IVC) is varied through steps S1501–S1504 discussed hereunder.

In step S1501, the compensated internal pressure Pc is read. In step S1502, a maximum volumetric flow rate QHO$_{max}$ is arithmetically calculated or retrieved on the basis of the compensated internal pressure Pc, from a predetermined characteristic map data preprogrammed on the assumption that the internal-valve closure timing (IVC) is fixed to the bottom dead center (BDC) and showing how the maximum volumetric flow rate QHO$_{max}$ has to be varied relative to the compensated internal pressure Pc. In step S1503, the desired volumetric flow rate QHO is read. In step S1504, an intake-valve opening time period is arithmetically calculated on the basis of both the desired volumetric flow rate QHO and the maximum volumetric flow rate QHO$_{max}$, from a predetermined expression (INTAKE-VALVE OPENING TIME PERIOD)=180°×QHO/QHO$_{max}$), where 180° denotes a predetermined crank angle. Then, the ECU 113 outputs a drive signal corresponding to the intake-valve closure timing determined through steps S1501–S1504 to the intake-valve side electromagnetic actuator, so that the intake valve 108 is opened at the top dead center (TDC), and then closed at the intake-valve closure timing (IVC) determined.

As will be appreciated from the first desired-intake-valve-open-timing plus desired-intake-valve-closure-timing arithmetic-calculation routine, the desired intake-pipe internal pressure (Pt) is effectively compensated for on the basis of at least the intake-valve operation delay-time fluctuation rate (D), so as to suppress fluctuations in a quantity of intake air entering each engine cylinder. In case that the desired intake air quantity is same, it is necessary to lengthen the intake-valve opening time period if the internal pressure in the intake pipe is low. On the other hand, in case that the intake-valve operation delay-time fluctuation rate (D) is same, it is difficult to exert a remarkable influence on the intake-air quantity by the same valve operation delay-time fluctuations, as the intake-valve opening time period increases. For the reasons set out above, in the first desired-intake-valve-open-timing plus desired-intake-valve-closure-timing arithmetic-calculation routine, the desired internal pressure (Pt) is decreasingly corrected when the intake-valve operation delay-time fluctuation rate (D) is great. Owing to the decreasingly corrected, desired internal pressure (Pc), the intake-valve opening time period can be corrected to a longer period. As a result, it is possible to reduce fluctuations in the intake-air quantity occurring due to the intake-valve operation delay-time fluctuations, thus enhancing the driveability of the vehicle. In the shown embodiment, the desired intake-valve open timing and the desired intake-valve closure timing can be controlled depending on both the compensated internal pressure (Pc) and the desired intake-air quantity (the desired volumetric flow rate QHO). In lieu thereof, an internal pressure in the intake pipe, obtained as a result of execution cycle of the intake-system control based on the compensated intake-pipe internal pressure (Pc), may be detected directly by means of a pressure sensor or indirectly estimated from input informational data. In order for the electronic engine control system to control the intake-valve open timing (IVO) and the intake-valve closure timing (IVC), the ECU may use the intake-pipe internal pressure detected or estimated.

According to the routine shown in FIG. 10, the desired internal pressure (Pt) is corrected on the basis of the desired intake-air quantity (the desired volumetric flow rate QHO) as well as the intake-valve operation delay-time fluctuation rate (D). Thus, even when the intake-valve operation delay-time fluctuation rate (D) is above the predetermined threshold ($\epsilon$1) and additionally the desired intake-air quantity (the desired volumetric flow rate QHO or the engine load) is above the predetermined threshold ($\epsilon$2), the desired intake-pipe internal pressure value (Pt), temporarily decreasingly corrected owing to the intake-valve operation delay-time fluctuation rate (D) above the predetermined threshold ($\epsilon$1), can be recovered to a properly higher pressure level owing to the high engine-load demand (QHO>$\epsilon$2). This prevents the internal pressure in the intake pipe from being dropped excessively, thus ensuring the reduced pumping loss (see the flow from step S1204 through steps S1205–S1210, S1217, and S1218 to step S1219). Also, when the intake-valve operation delay-time fluctuation rate (D) is above the predetermined threshold ($\epsilon$1) and additionally the desired intake-air quantity (the desired volumetric flow rate QHO) is below the predetermined threshold ($\epsilon$2) and thus the engine load is low, the desired intake-pipe internal pressure (Pt) is decreasingly corrected owing to the intake-valve operation delay-time fluctuation rate (D). This effectively suppresses undesired fluctuations in the intake-air quantity during the low engine load.

According to the intake-valve operation delay-time fluctuation rate (D) arithmetic-calculation routine shown in FIG. 5, a dead time from a time when either one of a command indicative of initiation of an intake-valve closing action and a command indicative of initiation of an intake-valve opening action is outputted to a time when the intake valve begins to move actually, is detected as the intake-valve operation delay time. The desired intake-pipe internal pressure (Pt) is compensated for depending on fluctuations in the dead time. The detection of the intake-valve operation delay time based on the dead time is effective to suppress the fluctuations in the intake-air quantity. Alternatively, a time interval (an operating time) from a time when either one of a command indicative of initiation of an intake-valve closing action and a command indicative of initiation of an intake-valve opening action is outputted to a time when the intake valve begins to move actually and then reaches a predetermined valve lift (that is, a valve full-open position or a valve fully-closed position), is detected as the intake-valve operation delay time. The detection of the intake-valve operation delay time based on the operating time containing the dead time is effective to suppress the fluctuations in the intake-air quantity.

In the shown embodiment, a mean value (B) of the intake-valve operation delay times (Tn) detected for each of engine cylinders is first calculated. Then, a deviation (|Tn−B|) of the intake-valve operation delay time from the mean value (B) is arithmetically calculated for every engine cylinder. Finally, the highest one of all the deviations (|T$_1$−B|, |T$_2$−B|, |T$_3$−B|, |T$_4$−B|) is set at the intake-valve operation delay-time fluctuation rate (D). In the presence of the great dispersion of the intake-valve operation delay times among the respective engine cylinders, the desired intake-pipe internal pressure (Pt) can be effectively corrected, while suppressing influences from the great valve operation delay-time dispersion.

According to the intake-valve operation delay-time fluctuations detection routine, the fluctuations in engine speed (Ne) are used or detected as a correlative value correlated to the intake-valve operation delay time fluctuations or the intake-valve operation delay-time fluctuation rate (D). Thus, it is possible to easily estimate or detect the intake-valve operation delay-time fluctuation rate from engine-speed fluctuations.

According to the second desired-intake-valve-open-timing plus desired-intake-valve-closure-timing arithmetic-calculation routine shown in FIG. 4 and the desired intake-pipe internal pressure (Pt) compensation routine based on the desired intake-air quantity (the desired volumetric flow rate QHO), the desired internal pressure (Pt) is corrected depending on at least the desired intake-air quantity (the desired volumetric flow rate QHO), so that the internal pressure in the intake pipe is dropped to a lower level when the desired intake-air quantity (QHO) is small and thus the intake-valve operation delay-time fluctuations may exert a great influence on the actual intake-air quantity. Owing to the dropped internal pressure (the decreasingly compensated internal pressure Pc), the intake-valve opening time period is lengthened (see steps S1502–S1504 of FIG. 13) so as to attain the desired intake-air quantity (the desired volumetric flow rate QHO). This effectively suppresses the intake-air quantity from being affected by the intake-valve operation delay-time fluctuations.

The entire contents of Japanese Patent Application No. P11-7620 (filed Jan. 14, 1999) is incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An intake-air quantity control apparatus for an internal combustion engine with a variable valve timing system associated with at least an intake valve, comprising:

a control unit which controls an intake-air quantity of air entering the internal combustion engine on the basis of at least one of an intake valve open timing and an intake valve closure timing of the intake valve: said control unit comprising (1) a desired internal pressure determination section which determines a desired internal pressure in an intake-air passage on the basis of a predetermined operating parameter, (2) an operation delay-time fluctuation rate detection section which detects an operation delay-time fluctuation rate for fluctuations in an operation delay time of at least the intake valve, (3) a desired intake-air quantity arithmetic-calculation section which arithmetically calculates a desired intake-air quantity on the basis of engine operating conditions, (4) a compensation section which compensates for the desired internal pressure on the basis of at least one of the operation delay-time fluctuation rate and the desired intake-air quantity to produce a compensated internal pressure, (5) a throttle-opening control section which controls a throttle opening on the basis of both the compensated internal pressure and the desired intake-air quantity, and (6) an intake-valve timing control section which controls the intake valve open timing and the intake valve closure timing on the basis of both the compensated internal pressure and the desired intake-air quantity.

2. An intake-air quantity control apparatus for an internal combustion engine with a variable valve timing system associated with at least an intake valve located at each of engine cylinders, comprising:

a control unit which controls an intake-air quantity of air entering the internal combustion engine on the basis of at least one of an intake valve open timing and an intake valve closure timing of the intake valve: said control unit comprising (1) a desired internal pressure determination section which determines a desired internal pressure (Pt) in an intake-air passage on the basis of at least an engine temperature (Tw), (2) an operation delay-time fluctuation rate detection section which detects an operation delay-time fluctuation rate (D) for fluctuations in an operation delay time of at least the intake valve, (3) a desired intake-air quantity arithmetic-calculation section which arithmetically calculates a desired intake-air quantity (QHO) on the basis of operating parameters corresponding to engine speed (Ne) and engine load (APO), (4) a compensation section which compensates for the desired internal pressure (Pt) on the basis of at least the operation delay-time fluctuation rate (D) to produce a compensated internal pressure (Pc), (5) a throttle-opening control section which controls a throttle opening (TVO) on the basis of both the compensated internal pressure (Pc) and the desired intake-air quantity (QHO), and (6) an intake-valve timing control section which controls the intake valve open timing and the intake valve closure timing on the basis of both the compensated internal pressure (Pc) and the desired intake-air quantity (QHO).

3. The intake-air quantity control apparatus as claimed in claim 2, wherein said compensation section compensates for the desired internal pressure (Pt) on the basis of both the operation delay-time fluctuation rate (D) and the desired intake-air quantity (QHO).

4. The intake-air quantity control apparatus as claimed in claim 2, wherein said operation delay-time fluctuation rate detection section detects a dead time from a time when either one of a command indicative of initiation of a closing action of the intake valve and a command indicative of initiation of an opening action of the intake valve is outputted to a time when the intake valve begins to move actually, as the operation delay time.

5. The intake-air quantity control apparatus as claimed in claim 2, wherein said operation delay-time fluctuation rate detection section detects a time interval from a time when either one of a command indicative of initiation of a closing action of the intake valve and a command indicative of initiation of an opening action of the intake valve is outputted to a time when the intake valve begins to move actually and then reaches a predetermined valve lift, as the operation delay time.

6. The intake-air quantity control apparatus as claimed in claim 5, wherein said operation delay-time fluctuation rate detection section arithmetically calculates a mean value (B) of operation delay times (Tn) detected for each of the engine cylinders, and arithmetically calculates absolute values (|Tn−B|) of deviations of the operation delay times (Tn) from the mean value (B), and set a highest one of absolute values (|Tn−B|) of deviations at the operation delay-time fluctuation rate (D).

7. The intake-air quantity control apparatus as claimed in claim 2, wherein said operation delay-time fluctuation rate detection section uses fluctuations in the engine speed (Ne) as input information representative of a correlative value correlated to the operation delay-time fluctuation rate.

8. An intake-air quantity control apparatus for an internal combustion engine with a variable valve timing system associated with at least an intake valve, comprising:

a control unit which controls an intake-air quantity of air entering the internal combustion engine on the basis of at least one of an intake valve open timing and an intake valve closure timing of the intake valve: said control unit comprising (1) a desired internal pressure determination section which determines a desired internal pressure (Pt) in an intake-air passage on the basis of at least an engine temperature (Tw), (2) a desired intake-air quantity arithmetic-calculation section which arithmetically calculates a desired intake-air quantity (QHO) on the basis of operating parameters corresponding to engine speed (Ne) and engine load (APO), (3) a compensation section which compensates for the desired internal pressure (Pt) on the basis of at least the desired intake-air quantity (QHO) to produce a compensated internal pressure (Pc), (4) a throttle-opening control section which controls a throttle opening (TVO) on the basis of both the compensated internal pressure (Pc) and the desired intake-air quantity (QHO), and (5) an intake-valve timing control section which controls the intake valve open timing and the intake valve closure timing on the basis of both the compensated internal pressure (Pc) and the desired intake-air quantity (QHO).

9. In an electronically-controlled internal combustion engine with a variable valve timing system associated with at least an intake valve, an electronically-controlled throttle, and an intake-valve side actuator capable of adjusting an opening of the intake valve, an intake-air quantity control system configured to be electronically connected to the electronically-controlled throttle for controlling a throttle opening and connected to the intake-valve side actuator for controlling an intake-air quantity of air entering the internal combustion engine on the basis of at least one of an intake valve open timing and an intake valve closure timing of the intake valve, comprising:

(1) a desired internal pressure determination means for determining a desired internal pressure (Pt) in an intake-air passage on the basis of at least an engine coolant temperature (Tw), (2) an operation delay-time fluctuation rate detection means for detecting an operation delay-time fluctuation rate (D) for fluctuations in an operation delay time of at least the intake valve, (3) a desired intake-air quantity arithmetic-calculation means for arithmetically calculating a desired intake-air quantity (QHO) on the basis of engine operating conditions (Ne, APO), (4) a compensation means for compensating for the desired internal pressure (Pt) on the basis of at least one of the operation delay-time fluctuation rate (D) and the desired intake-air quantity (QHO) to produce a compensated internal pressure (Pc), (5) a throttle-opening control means connected to the electronically-controlled throttle for controlling a throttle opening on the basis of both the compensated internal pressure (Pc) and the desired intake-air quantity (QHO), and (6) an intake-valve timing control means connected to the intake-valve side actuator for controlling the intake valve open timing and the intake valve closure timing on the basis of both the compensated internal pressure (Pc) and the desired intake-air quantity (QHO).

10. The intake-air quantity control system as claimed in claim 9, wherein the intake-valve side actuator comprises an electromagnetic actuator.

11. A method for controlling an intake-air quantity of air entering each of engine cylinders for a computer-controlled internal combustion engine with a variable valve timing system associated with at least an intake valve located at each of the engine cylinders, an electronically-controlled throttle, and an intake-valve side actuator capable of adjusting an opening of the intake valve, an intake-air quantity control system configured to be electronically connected to the electronically-controlled throttle for controlling a throttle opening and connected to the intake-valve side actuator for controlling an intake-air quantity of air entering the internal combustion engine on the basis of at least one of an intake valve open timing and an intake valve closure timing of the intake valve, the method comprising:

determining a desired internal pressure (Pt) in an intake-air passage on the basis of at least an engine temperature (Tw), detecting an operation delay-time fluctuation rate (D) for fluctuations in an operation delay time of at least the intake valve, arithmetically calculating a desired intake-air quantity (QHO) on the basis of operating parameters corresponding to engine load (Ne) and engine load (APO), compensating for the desired internal pressure (Pt) on the basis of at least the operation delay-time fluctuation rate (D) to produce a compensated internal pressure (Pc), controlling a throttle opening of the electronically-controlled throttle on the basis of both the compensated internal pressure (Pc) and the desired intake-air quantity (QHO), and controlling the intake valve open timing and the intake valve closure timing on the basis of both the compensated internal pressure (Pc) and the desired intake-air quantity (QHO).

12. The method as claimed in claim 11, wherein the desired internal pressure (Pt) is decreasingly corrected by a predetermined constant ($\alpha$) when the operation delay-time fluctuation rate (D) exceeds a predetermined threshold value ($\epsilon1$), to produce the compensated internal pressure (pc=Pt–$\alpha$).

13. A method for controlling an intake-air quantity of air entering each of engine cylinders for a computer-controlled internal combustion engine with a variable valve timing system associated with at least an intake valve, an electronically-controlled throttle, and an intake-valve side actuator capable of adjusting an opening of the intake valve, an intake-air quantity control system configured to be electronically connected to the electronically-controlled throttle for controlling a throttle opening and connected to the intake-valve side actuator for controlling an intake-air quantity of air entering the internal combustion engine on the basis of at least one of an intake valve open timing and an intake valve closure timing of the intake valve, the method comprising:

determining a desired internal pressure (Pt) in an intake-air passage on the basis of at least an engine temperature (Tw), arithmetically calculating a desired intake-air quantity (QHO) on the basis of operating parameters corresponding to engine speed (Ne) and engine load (APO), compensating for the desired internal pressure (Pt) on the basis of at least the desired intake-air quantity (QHO) to produce a compensated internal pressure (Pc), controlling a throttle opening of the electronically-controlled throttle on the basis of both the compensated internal pressure (Pc) and the desired intake-air quantity (QHO), and controlling the intake valve open timing and the intake valve closure timing on the basis of both the compensated internal pressure (Pc) and the desired intake-air quantity (QHO).

14. The method as claimed in claim 13, which further comprises retrieving a correction pressure value (Pr) based on the desired intake-air quantity (QHO) from a predetermined characteristic map having a characteristic that the correction pressure value (Pr) decreases as the desired intake-air quantity (QHO) increases, and the compensated internal pressure (Pc) is arithmetically calculated by subtracting the correction pressure value (Pr) from the desired internal pressure (Pt).

15. A method for controlling an intake-air quantity of air entering each of engine cylinders for a computer-controlled internal combustion engine with a variable valve timing system associated with at least an intake valve, an electronically-controlled throttle, and an intake-valve side actuator capable of adjusting an opening of the intake valve, an intake-air quantity control system configured to be electronically connected to the electronically-controlled throttle for controlling a throttle opening and connected to the intake-valve side actuator for controlling an intake-air quantity of air entering the internal combustion engine on the basis of at least one of an intake valve open timing and an intake valve closure timing of the intake valve, the method comprising:

determining a desired internal pressure (Pt) in an intake-air passage on the basis of at least an engine coolant temperature (Tw), detecting an operation delay-time fluctuation rate (D) for fluctuations in an operation delay time of at least the intake valve, arithmetically calculating a desired intake-air quantity (QHO) on the basis of engine operating conditions (Ne, APO), compensating for the desired internal pressure (Pt) on the basis of at least one of the operation delay-time fluctuation rate (D) and the desired intake-air quantity (QHO) to produce a compensated internal pressure (Pc), controlling a throttle opening of the electronically-controlled throttle on the basis of both the compensated internal pressure (Pc) and the desired intake-air quantity (QHO), and controlling the intake valve open timing and the intake valve closure timing on the basis of both the compensated internal pressure (Pc) and the desired intake-air quantity (QHO).

16. The method as claimed in claim 15, wherein, when the operation delay-time fluctuation rate (D) exceeds a first predetermined threshold value ($\epsilon1$) and the desired intake-air quantity (QHO) exceeds a second predetermined threshold value ($\epsilon2$), the desired internal pressure (Pt) is temporarily decreased by a predetermined constant ($\alpha$) to produce a temporarily-decreased internal pressure, and then the temporarily-decreased internal pressure is further corrected by adding a product ((QHO–$\epsilon2$)×k) of a predetermined correction factor (k) and a difference (QHO–$\epsilon2$) between the desired intake-air quantity (QHO) and the second predetermined threshold value ($\epsilon2$) to the temporarily-decreased internal pressure, to produce the compensated internal pressure (Pc=(QHO–$\epsilon2$)×k)+Pt).

* * * * *